United States Patent
Masuda et al.

(10) Patent No.: US 11,231,594 B2
(45) Date of Patent: Jan. 25, 2022

(54) APPARATUS AND METHOD FOR IDENTIFICATION WITH REFERENCE IMAGE AND REFERENCE DISTANCE

(71) Applicant: TOPPAN PRINTING CO., LTD., Tokyo (JP)

(72) Inventors: Tomohito Masuda, Tokyo (JP); Eri Miyamoto, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 16/696,761

(22) Filed: Nov. 26, 2019

(65) Prior Publication Data
US 2020/0096781 A1 Mar. 26, 2020

Related U.S. Application Data

(63) Continuation of application No. PCT/JP2018/020227, filed on May 25, 2018.

(30) Foreign Application Priority Data

May 26, 2017 (JP) .............................. JP2017-104723

(51) Int. Cl.
*H04N 7/18* (2006.01)
*G02B 27/42* (2006.01)
(Continued)

(52) U.S. Cl.
CPC ....... *G02B 27/4205* (2013.01); *B42D 25/328* (2014.10); *G06K 9/2036* (2013.01);
(Continued)

(58) Field of Classification Search
CPC .... G02B 27/4205; G02B 5/18; B42D 25/328; B42D 25/21; G06K 9/2036; G06K 9/6202;
(Continued)

(56) References Cited

U.S. PATENT DOCUMENTS

2003/0178282 A1* 9/2003 Bao ........................ G06K 9/00
194/328
2008/0031542 A1* 2/2008 Lei ........................ G07D 7/206
382/283
(Continued)

FOREIGN PATENT DOCUMENTS

DE 10 2013 101 587 8/2014
JP 2006-350995 A 12/2006
(Continued)

OTHER PUBLICATIONS

International Searching Authority, "International Search Report," issued in connection with International Patent Application No. PCT/JP2018/020227, dated Aug. 7, 2018.
(Continued)

*Primary Examiner* — Richard T Torrente
(74) *Attorney, Agent, or Firm* — Foley & Lardner LLP

(57) ABSTRACT

An identification apparatus or system includes an estimation unit that estimates an operating distance between the surface of an optical device and an imaging unit as an estimated value. A reference distance refers to the distance between a first face of an identification target and the imaging unit and at which light diffracted by a diffraction grating is capable of being recorded by the imaging unit. A first determination unit is included that determines whether the estimated value matches the reference distance and a second determination unit that determines whether an image captured by the imaging unit matches a reference image. Conditions for identifying the optical device as the identification target include a condition that the first determination unit determines that the estimated value matches the reference distance and a condition that the second determination unit
(Continued)

determines that the image captured by the imaging unit matches the reference image.

16 Claims, 9 Drawing Sheets

(51) Int. Cl.
| | |
|---|---|
| B42D 25/328 | (2014.01) |
| G06K 9/20 | (2006.01) |
| G06K 9/62 | (2006.01) |
| H04N 5/225 | (2006.01) |
| H04N 5/232 | (2006.01) |
| B42D 25/21 | (2014.01) |
| G07D 7/17 | (2016.01) |
| G07D 7/121 | (2016.01) |
| G07D 7/202 | (2016.01) |

(52) U.S. Cl.
CPC ......... *G06K 9/6202* (2013.01); *H04N 5/2256* (2013.01); *H04N 5/23222* (2013.01); *B42D 25/21* (2014.10); *G07D 7/121* (2013.01); *G07D 7/17* (2017.05); *G07D 7/205* (2013.01); *G07D 2207/00* (2013.01)

(58) Field of Classification Search
CPC .... H04N 5/2256; H04N 5/23222; G07D 7/17; G07D 7/121; G07D 7/205; G07D 2207/00; G07D 7/12; G07D 7/003; G07D 7/206
See application file for complete search history.

(56) References Cited

U.S. PATENT DOCUMENTS

| | | | | |
|---|---|---|---|---|
| 2011/0025842 | A1* | 2/2011 | King | H04N 1/0036 |
| | | | | 348/135 |
| 2011/0176137 | A1* | 7/2011 | Gerigk | B42D 25/29 |
| | | | | 356/446 |
| 2016/0307035 | A1* | 10/2016 | Schilling | B42D 25/342 |
| 2016/0378061 | A1* | 12/2016 | Reinhardt | H04W 4/50 |
| | | | | 382/154 |
| 2017/0021660 | A1* | 1/2017 | Petiton | B42D 25/328 |
| 2017/0318239 | A1* | 11/2017 | Miyasaka | G02B 5/0294 |
| 2019/0251774 | A1* | 8/2019 | Azanza Ladron | G06T 7/97 |

FOREIGN PATENT DOCUMENTS

| | | |
|---|---|---|
| JP | 2015-182306 A | 10/2015 |
| WO | WO-2016/121210 A1 | 8/2016 |
| WO | WO-2016/147813 A1 | 9/2016 |
| WO | WO-2016/190107 A1 | 12/2016 |

OTHER PUBLICATIONS

International Searching Authority, "Written Opinion," issued in connection with International Patent Application No. PCT/JP2018/020227, dated Aug. 7, 2018.

Extended European Search Report dated May 6, 2020 for corresponding European Patent Application No. 18805832.5.

* cited by examiner

APPARATUS AND METHOD FOR IDENTIFICATION WITH REFERENCE IMAGE AND REFERENCE DISTANCE

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2018/020227, filed on May 25, 2018, which is based upon and claims the benefit of priority to Japanese Patent Application No. 2017-104723, filed on May 26, 2017; the disclosures of which are all incorporated herein by reference in their entireties.

TECHNICAL FIELD

The present invention relates to an identification apparatus or system, an identification method, and an identification program for identifying whether an optical device matches an identification target using an image formed by a diffraction grating.

BACKGROUND ART

Optical devices including a diffraction grating for the hindrance or prevention of counterfeiting and copying are attached to valuable securities such as stock certificates and merchandise coupons, and various products such as pharmaceuticals, food, and brand-name items. These kinds of optical devices are identified as identification targets, by specialist users, with special devices. The expertise includes, for example, an angle at which visible light for identification is applied to an optical device and a direction in which the optical device irradiated with the visible light is observed (for example, refer to PTLs 1 to 4).

CITATION LIST

[Patent Literatures]: [PTL 1] WO 2016/121210-A1; [PTL 2] WO 2016/147813-A1; [PTL 3] WO 2016/190107-A1; [PTL 4] JP 2006-350995-A.

SUMMARY OF THE INVENTION

Technical Problem

The optical devices mentioned above as examples include diffraction gratings that emit diffracted light in a negative angular range. When the visible light is applied to this kind of optical device, the diffraction grating emits first-order diffracted light. Unlike the direction in which specular reflected light travels, the first-order diffracted light travels in a direction close to the direction from such an optical device to an irradiation unit. Portable terminals such as smartphones and tablet terminals include an imaging unit near an irradiation unit on one face oriented toward such an optical device. Thus, these portable terminals are suitable for capturing images formed by first-order diffracted light and have the potential to enhance general-purpose usability of identification.

Whether capture of an image formed by the first-order diffracted light is possible varies depending on changes in the relative positions of the optical device, the irradiation unit, and the imaging unit. The result of identifying whether the image formed by the first-order diffracted light matches a predetermined image also varies depending on changes in the relative positions of the optical device, the irradiation unit, and the imaging unit. Therefore, there is a need for a technique for enhancing the accuracy of identifying whether an optical device matches an identification target using a device including an irradiation unit and an imaging unit on one surface.

An object of the present invention is to provide an identification apparatus or system, an identification method, and an identification program that improve the accuracy of identifying whether an optical device matches an identification target.

[Solution to Problem]

An identification apparatus or system for solving the foregoing issue is an apparatus or system that identifies whether an optical device matches an identification target. With respect to a normal to a first face of the identification target, an incident side of light is in a negative angular range, and a specular reflection side of the light is in a positive angular range. The identification target includes on the first face a diffraction grating that emits diffracted light in the negative angular range. The identification apparatus or system includes: an irradiation unit that is located on a second face of the identification apparatus or system oriented toward the optical device and applies visible light to a surface of the optical device; an imaging unit that is located on the second face and captures an image of the surface of the optical device with an angle between the normal to the surface of the optical device and a direction of the diffracted light that is emitted from the surface of the optical device and is entering the imaging unit being a reference angle, the reference angle being formed by the normal to the first face of the identification target and a direction of the diffracted light that is emitted from the first face of the identification target and is entering the imaging unit and being an angle at which the light diffracted by the diffraction grating is capable of being recorded by the imaging unit; an estimation unit that estimates a distance between the surface of the optical device and the imaging unit as an estimated value; a first determination unit that determines whether the estimated value matches a reference distance, the reference distance being between the first face of the identification target and the imaging unit and being a distance at which the light diffracted by the diffraction grating is capable of being recorded by the imaging unit; a second determination unit that determines whether the image captured by the imaging unit matches a reference image, the reference image being formed from the light diffracted by the diffraction grating; and an identification unit that identifies the optical device as the identification target when conditions are satisfied including a condition that the first determination unit determines that the estimated value matches the reference distance and a condition that the second determination unit determines that the image captured by the imaging unit matches the reference image.

An identification method for solving the foregoing issue is an identification method using an identification apparatus or system to identify whether an optical device matches an identification target. With respect to a normal to a first face of the identification target, an incident side of light is in a negative angular range, and a specular reflection side of the light is in a positive angular range. The first face of the identification target includes a diffraction grating that emits diffracted light in the negative angular range. The identification apparatus or system includes an irradiation unit and an imaging unit on a second face of the identification apparatus or system oriented toward the optical device. The identification method includes: applying visible light to a surface of the optical device; capturing an image of the surface of the optical device with angle between the normal to the surface of the optical device and a direction of the diffracted light that is emitted from the surface of the optical device and is entering the imaging unit being a reference angle, the reference angle being formed by the normal to the first face of the identification target and a direction of the diffracted light that is emitted from the first face of the identification target and is entering the imaging unit and being an angle at which the light diffracted by the diffraction grating is capable of being recorded by the imaging unit; estimating a distance between the surface of the optical device and the imaging unit as an estimated value; determining whether the estimated value matches a reference distance, the reference distance being between the first face of the identification target and the imaging unit and being a distance at which the light diffracted by the diffraction grating is capable of being recorded by the imaging unit; determining whether the image captured by the imaging unit matches a reference image, the reference image being formed from the light diffracted by the diffraction grating; and identifying the optical device as the identification target when conditions are satisfied including a condition that it is determined that the estimated value matches the reference distance and a condition that it is determined that the image captured by the imaging unit matches the reference image.

An identification program for solving the foregoing issue is an identification program for causing an apparatus or system including an irradiation unit and an imaging unit to serve as an identification apparatus or system that identifies whether an optical device matches an identification target. With respect to a normal to a first face of the identification target, an incident side of light is in a negative angular range and a specular reflection side of the light is in a positive angular range. The first face of the identification target includes a diffraction grating that emits diffracted light in the negative angular range. The irradiation unit and the imaging unit are included on a second face of the apparatus or system oriented toward the optical device. The identification program causes the apparatus or system to execute steps of: applying visible light to a surface of the optical device; capturing an image of the surface of the optical device with angle between the normal to the surface of the optical device and a direction of the diffracted light that is emitted from the surface of the optical device and is entering the imaging unit being a reference angle, the reference angle being formed by the normal to the first face of the identification target and a direction of the diffracted light that is emitted from the first face of the identification target and is entering the imaging unit and being an angle at which the light diffracted by the diffraction grating is capable of being recorded by the imaging unit; estimating a distance between the surface of the optical device and the imaging unit as an estimated value; determining whether the estimated value matches a reference distance, the reference distance being between the first face of the identification target and the imaging unit and being a distance at which the light diffracted by the diffraction grating is capable of being recorded by the imaging unit; determining whether the image captured by the imaging unit matches a reference image, the reference image being formed from the light diffracted by the diffraction grating; and identifying the optical device as the identification target when conditions are satisfied including a condition that it is determined that the estimated value matches the reference distance and a condition that it is determined that the image captured by the imaging unit matches the reference image.

As with the identification target, an optical device including a diffraction grating that emits diffracted light in the negative angular range emits the diffracted light in the negative angular range, that is, in the vicinity of the irradiation unit as seen from the diffraction grating. Therefore, in the identification of an optical device including a diffraction grating that emits diffracted light in the negative angular range, the imaging unit capturing an image for use in identification needs to be located on the same side as the irradiation unit with respect to the optical device. In this respect, according to the foregoing configurations, the irradiation unit and the imaging unit are both located on the second face oriented to the surface of the optical device. In addition, the imaging unit captures an image with reference angle being formed by the normal to the first face of the identification target and a direction of the diffracted light that is emitted from the first face of the identification target and is entering the imaging unit. Further, the conditions for identifying the optical device as the identification target include the condition that the estimated value of the distance between the surface of the optical device and the imaging unit matches the reference distance and the condition that the image captured by the imaging unit matches the reference image. As a result, the identification of whether the optical device matches the identification target reflects the suitability of the angle between the normal to the surface of the optical device and a direction of the diffracted light that is emitted from the surface of the optical device and is entering the imaging unit and the suitability of the distance between the surface of the optical device and the imaging unit. That is, the result of the identification reflects the suitability of the relative position of the imaging unit to the optical device and the suitability of the relative position of the irradiation unit to the optical device. Therefore, it is possible to enhance the accuracy of the identification of whether the optical device matches the identification target.

The identification apparatus or system may further include a guidance unit that, when the first determination unit determines that the estimated value does not match the reference distance, outputs guidance externally from the identification apparatus or system. The guidance outputted by the guidance unit may be guidance for leading the identification apparatus to a position at which the estimated value matches the reference distance.

According to the identification apparatus or system, it is possible to capture an image of the optical device at a distance suitable for capturing an image to be used in identification, that is, capture an image of the optical device at a position where the image to be captured for identification can be captured. As a result, it is possible to reduce difficulty in identification that would be caused by inability to capture the image formed from first-order diffracted light emitted by the diffraction grating.

In the identification apparatus or system, the imaging unit may include an imaging optical system for imaging the surface of the optical device, drive the imaging optical system so that an image point of the optical device lies in an image plane, and capture an image of the optical device with the image point of the optical device lying in the image plane. The estimation unit may calculate the estimated value using optical parameters of the imaging optical system, the optical parameters being used when the imaging unit captures the image of the surface of the optical device.

The imaging optical system that causes the image point of the optical device to lie in the image plane is driven by optical parameters according to the distance between the surface of the optical device and the imaging unit. According to the identification apparatus or system, a functional unit for imaging the optical device has the optical parameters for calculating the estimated value. Accordingly, it is possible to simplify the configuration of the identification apparatus or system as compared to a configuration in which the functional unit for collecting information for calculating the estimated value is separately provided in the identification apparatus or system.

In the identification apparatus or system, the distance between the irradiation unit and the imaging unit may be 5 mm or more and 20 mm or less on the second face. According to this identification apparatus, the distance between the irradiation unit and the imaging unit is 5 mm or more and 20 mm or less, which allows the use of a general-purpose portable device including an irradiation unit and an imaging unit as the identification apparatus or system.

In the identification apparatus or system, the imaging unit may capture a plurality of images of the surface of the optical device with the surface of the optical device and a direction of the diffracted light that is emitted from the surface of the optical device and is entering the imaging unit forming the reference angle and with the distance between the surface of the optical device and the imaging unit being different for each of the plurality of images. The estimation unit may calculate the estimated value of the distance for each of the images, the distance being the distance during capture of each of the images. The first determination unit may determine whether each estimated value matches the reference distance. The second determination unit may determine whether at least one of the images for which the first determination unit determines that the estimated value matches the reference distance matches the reference image.

According to the identification apparatus or system, before the determination by the second determination unit, the first determination unit performs the determination on each of the images. Then, for the image of which the first determination unit determines that the estimated value matches the reference distance, it is determined whether the image matches the reference image. Therefore, it is possible to shorten the time necessary for identifying whether the optical device matches the identification target as compared to a configuration in which the determination on whether the estimated value matches the reference distance and the determination on whether the captured image matches the reference image are performed on each of the images.

In the identification apparatus or system, the imaging unit may capture a plurality of images with the surface of the optical device and a direction of the diffracted light that is emitted from the surface of the optical device and is entering the imaging unit forming the reference angle and with the distance between the surface of the optical device and the imaging unit being different for each of the plurality of images. The second determination unit may determine whether each of the images matches the reference image. The estimation unit may calculate the estimated value of the distance for at least one of the images that the second determination unit determines as the reference image, the distance being the distance during capture of the at least one of the images. The first determination unit may determine whether the estimated value during capture of the at least one of the images determined by the second determination unit as matching the reference image matches the reference distance.

According to the identification apparatus or system, before the determination by the first determination unit, the second determination unit performs the determination on each of the images. Then, for the image that the second capture of the image matches the reference distance. Therefore, it is possible to shorten the time necessary for identifying whether the optical device matches the identification target as compared to a configuration in which the determination on whether the estimated value matches the reference distance and the determination on whether the captured image matches the reference image are performed on each of the images.

The identification apparatus or system may include a terminal device and a server. The terminal device may include the irradiation unit, the imaging unit, the estimation unit, the first determination unit, the second determination unit, and a first communication unit that transmits a result of the determination by the first determination unit and a result of the determination by the second determination unit. The server may include a second communication unit that receives the determination results from the first communication unit and the identification unit that performs identification using the determination results received by the second communication unit.

The identification apparatus or system may include a terminal device and a server. The terminal device may include the irradiation unit, the imaging unit, the estimation unit, and a first communication unit that transmits the image captured by the imaging unit and the estimated value to the server. The server may include a second communication unit that receives the image captured by the imaging unit and the estimated value from the first communication unit, the first determination unit that performs determination using the estimated value received by the second communication unit, the second determination unit that performs determination using the image received by the second communication unit, and the identification unit. The second communication unit may transmit a result of the identification by the identification unit to the terminal device.

An identification apparatus or system for solving the foregoing issue is an identification apparatus or system that identifies whether an optical device matches an identification target. With respect to a normal to a first face of the identification target, an incident side of light is in a negative angular range, and a specular reflection side of the light is in a positive angular range. The identification target includes a diffraction grating that emits diffracted light in the negative angular range on the first face. The terminal device includes: an irradiation unit that is located on a second face of the terminal device oriented toward the optical device and applies visible light to a surface of the optical device; an imaging unit that is located on the second face and captures an image of the surface of the optical device with an angle between the normal to the surface of the optical device and a direction of the diffracted light that is emitted from the surface of the optical device and is entering the imaging unit being a reference angle, the reference angle being formed by the first face of the identification target and the second face of the identification apparatus or system and being an angle at which the light diffracted by the diffraction grating is capable of being recorded by the imaging unit; an estimation unit that estimates a distance between the surface of the optical device and the imaging unit as an estimated value; and a first communication unit that transmits the image captured by the imaging unit and the estimated value to the identification apparatus or system. The identification apparatus or system includes: a second communication unit that receives the image captured by the imaging unit and the estimated value from the first communication unit; a first determination unit that determines whether the estimated value received by the second communication unit matches a reference distance, the reference distance being between the first face of the identification target and the imaging unit and being a distance at which the light diffracted by the diffraction grating is capable of being recorded by the imaging unit; a second determination unit that determines whether the image received by the second communication unit matches a reference image, the reference image being formed from the light diffracted by the diffraction grating; and an identification unit that identifies the optical device as the identification target when conditions are satisfied including a condition that the first determination unit determines that the estimated value matches the reference distance and a condition that the second determination unit determines that the image captured by the imaging unit matches the reference image.

DETAILED DESCRIPTION

Figure 1:
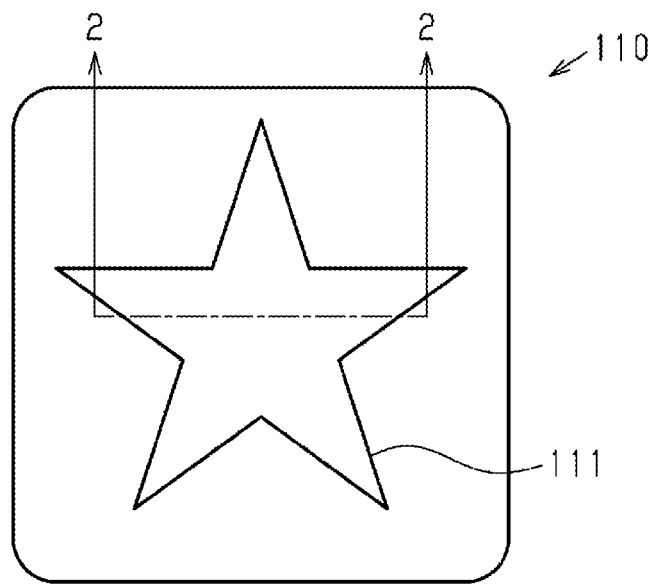
FIG. 1 is a plan view of an example of a planar structure of an identification target.

With reference to the accompanying Figures, a description will now be given of representative embodiments according to the present invention. The present invention is not limited to the following representative embodiments, and appropriate modifications can be made without departing from the spirit of the present invention. The representative embodiments described below are merely examples of the present invention, and the design thereof could be appropriately changed by one skilled in the art. Here, the drawings are schematic, and the relationship between thickness and plane size, the ratio of the thickness of each layer, etc., may be different from actual ones. The embodiments described below are merely examples of the configurations for embodying the technical idea of the present invention, and the technical idea of the present invention should not limit the materials, shapes, structures, and the like of the components to those described below. The technical idea of the present invention can be modified in various ways within the technical scope specified by the claims.

The same constituent elements are denoted by the same reference numerals unless there is a reason for the sake of convenience, and redundant description is omitted. In the drawings referred to in the following description, for clarity, characteristic parts are enlarged, and thus the components are not shown to scale. It is, however, clear that one or more embodiments can be implemented without such details. In addition, known structures and devices may be schematically represented for simplicity.

Embodiments of an identification apparatus or system, an identification method, and an identification program will now be described. First, a configuration of an identification target as a target to be identified by the identification apparatus and an optical action of the identification target will be described. Then, the identification apparatus, the identification method, and the identification program for identifying whether an optical device matches an identification target will be described.

[Identification Target 110]

As illustrated in FIG. 1, an identification target 110 is an optical sheet having optical functions. The identification target 110 includes a display part 111 on the surface of the identification target 110. The display part 111 changes the color, shape, or pattern of an image formed by the display part 111 depending on the angle at which the display part 111 is observed. When the identification target 110 is imaged in a direction perpendicular to the surface of the identification target 110, a star-shaped image formed by the display part 111 cannot be captured by the imaging unit. On the other hand, when the identification target 110 is imaged in a direction obliquely inclined to the surface of the identification target 110, the star-shaped image formed by the display part 111 can be captured by the imaging unit.

Figure 2:
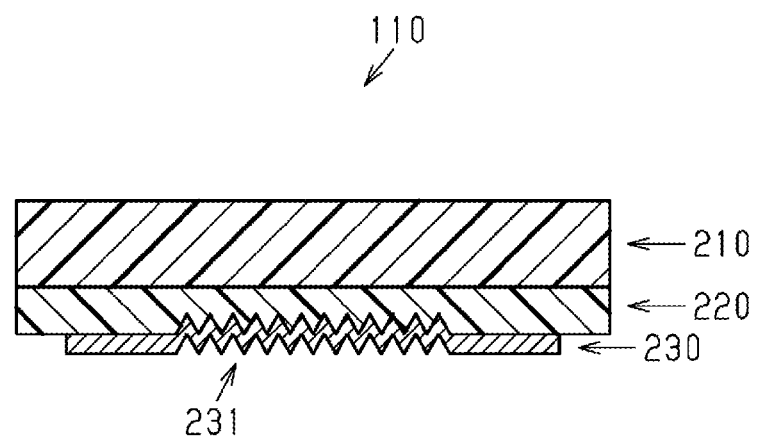
FIG. 2 is a cross-sectional view of an example of a cross-sectional structure of the identification target.

As illustrated in FIG. 2, the identification target 110 includes a substrate layer 210, an intermediate layer 220, and a reflection layer 230. The substrate layer 210 supports the intermediate layer 220 and the reflection layer 230 during manufacture or subsequent attachment of the identification target 110. The intermediate layer 220 includes fine concavities and convexities. The uneven shape of the intermediate layer 220 forms an uneven shape on the reflection layer 230. The reflection layer 230 reflects visible light incident on the reflection layer 230. The uneven shape of the reflection layer 230 follows the uneven shape of the intermediate layer 220 and serves as a diffraction grating 231. The spatial frequency of the concaves or the spatial frequency of the convexities in the uneven shape of the reflection layer 230 is 1000 cycles/mm or more and 3500 cycles/mm or less, for example. In addition, the pitch of the concaves or the pitch of the convexities in the uneven shape is 286 nm or more and 1000 nm or less, for example. The uneven shape of the intermediate layer 220 may be formed by various methods such as extrusion molding using a metallic stamper and heat press molding. The reflection layer 230 may be formed by various methods such as vapor deposition and sputtering.

Figure 3:
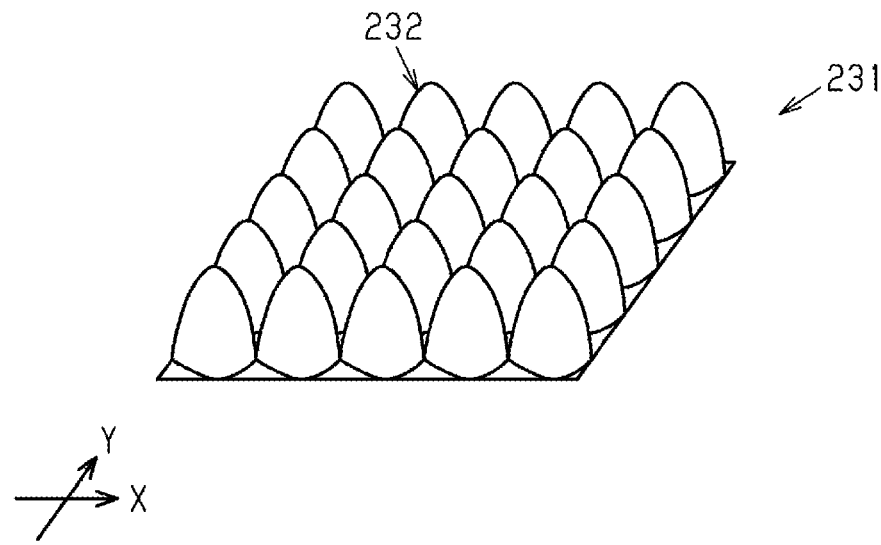
FIG. 3 is an enlarged perspective view of an example of a perspective structure of a portion of the identification target.

As in an example of FIG. 3, the diffraction grating 231 includes a plurality of convex surfaces 232. The convex surfaces 232 are regularly aligned in an X direction and a Y direction along the surface of the identification target 110. As seen in a direction perpendicular to the surface of the identification target 110, the convex surfaces 232 are also regularly aligned in a direction forming approximately 27° with respect to the X direction and in a direction forming 45° with respect to the X direction.

Figure 4:
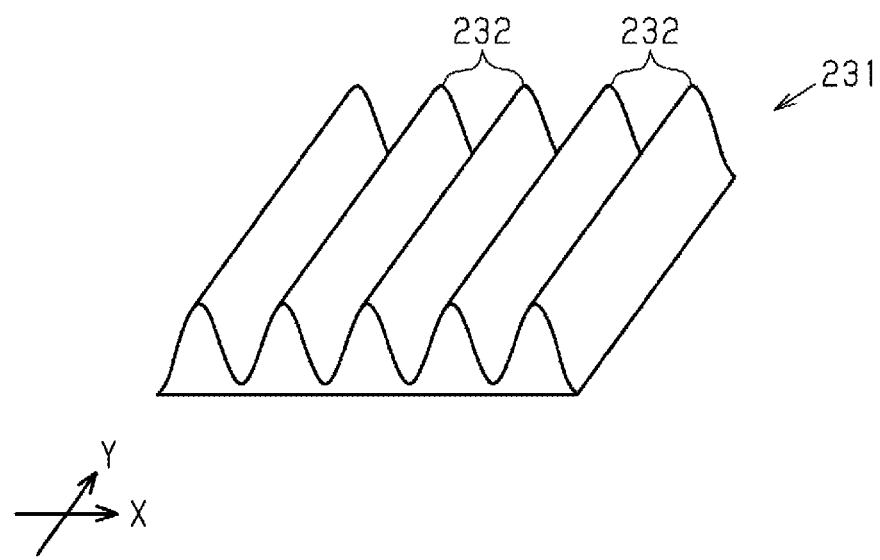
FIG. 4 is an enlarged perspective view of another example of a perspective structure of a portion of the identification target.

As in another example of FIG. 4, the diffraction grating 231 includes a plurality of convex surfaces 232 extending in the Y direction. The convex surfaces 232 are regularly aligned in the X direction along the surface of the identification target 110.

The identification target 110 emits diffracted light due to the regular alignment of the convex surfaces 232. When the alignment direction of the convex surfaces 232 and an orthographically projected vector of the imaging direction substantially coincide with each other, an image formed by the diffracted light can be captured by the imaging unit. The orthographically projected vector of the imaging direction is a vector obtained by projecting the imaging direction of the identification target 110 onto the surface of the identification target 110. The convex surfaces 232 of the diffraction grating 231 have a half spindle shape, a cone shape, a truncated cone shape, or the like. The cone shape includes a circular cone shape or a pyramidal shape. The truncated cone shape includes a truncated circular cone shape or a truncated pyramidal shape. The diffraction grating 231 is not limited to the configuration in which the convex surfaces 232 are aligned in two or more directions as illustrated in FIG. 3. The diffraction grating 231 may be configured such that concave surfaces are aligned in two or more directions or such that the concave surfaces are aligned in a single direction.

The traveling direction of diffracted light emitted from a reflective diffraction grating will now be described. First, the angular range of emission of the diffracted light will be described. Then, with reference to FIG. 5, description will be given of examples of angles at which the diffracted light is emitted from a diffraction grating DG in which a pitch d of the diffraction grating is larger than or equal to the maximum wavelength in the foregoing exemplified range, unlike the diffraction grating 231. Then, with reference to FIG. 6, description will be given of angles at which the diffracted light is emitted from the diffraction grating DG in which the pitch d of the diffraction grating is within the foregoing exemplified range like the diffraction grating 231.

First, the reflective diffraction grating emits diffracted light with high luminance in a predetermined direction. An imaging angle β as an angle of emission of m-order diffracted light (m=0, ±1, ±2, ...) is orthogonal to the surface of the diffraction grating and satisfies the following equation (1) in a vertical plane including the alignment direction of the convex surfaces 232.

$$d = m\lambda/(\sin\theta - \sin\beta) \quad \text{equation (1)}$$

In the equation (1), the pitch d represents the pitch in which unit cells are aligned in the diffraction grating, a constant m represents a diffraction order, a wavelength λ represents the wavelength of light included in irradiation light IL and the wavelength of light included in the diffracted light. The irradiation angle θ represents the incident angle of the irradiation light IL, and is equal to an absolute value of the angle at which specular reflected light as 0-order diffracted light is emitted. The irradiation angle θ is larger than or equal to 0° and smaller than 90°. The angle at which the specular reflected light is emitted is included in the positive angular range, and the angle at which the irradiation light IL is emitted is included in the negative angular range. When the direction at which the diffracted light is emitted is included in the positive angular range as with the direction in which the specular reflected light is emitted, the imaging angle β takes a positive value. On the other hand, when the direction at which the diffracted light is emitted is included in the negative angular range as with the direction in which the irradiation light IL is emitted, the imaging angle β takes a negative value.

Figure 5:
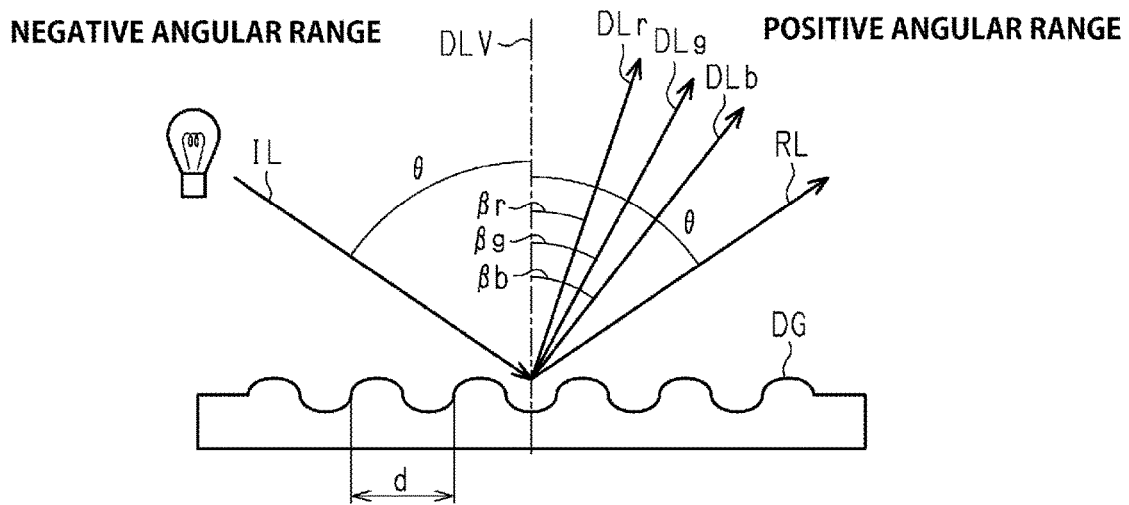
FIG. 5 is an action diagram illustrating directions of first-order diffracted light emitted from a diffraction grating.

As illustrated in FIG. 5, the diffraction grating DG has a pitch d of 1000 nm or more, for example. The irradiation light IL emitted by the irradiation unit is white light as an example of visible light. When the irradiation light IL is applied to the diffraction grating DG at the irradiation angle θ, the diffraction grating DG emits the specular reflected light or the specular reflected light RL as 0-order diffracted light. The diffraction grating DG emits red diffracted light DLr, green diffracted light DLg, and blue diffracted light DLb as first-order diffracted light. An emission angle βr of the red diffracted light DLr, an emission angle βg of the green diffracted light DLg, and an emission angle βb of the blue diffracted light DLb are included in the positive angular range with respect to a front view direction DLV of the diffraction grating DG. Therefore, when the irradiation unit is positioned in the negative angular range and the imaging unit is positioned in the positive angular range, the images formed by the diffracted light of the respective colors DLr, DLg, and DLb are captured by the imaging unit.

Figure 6:
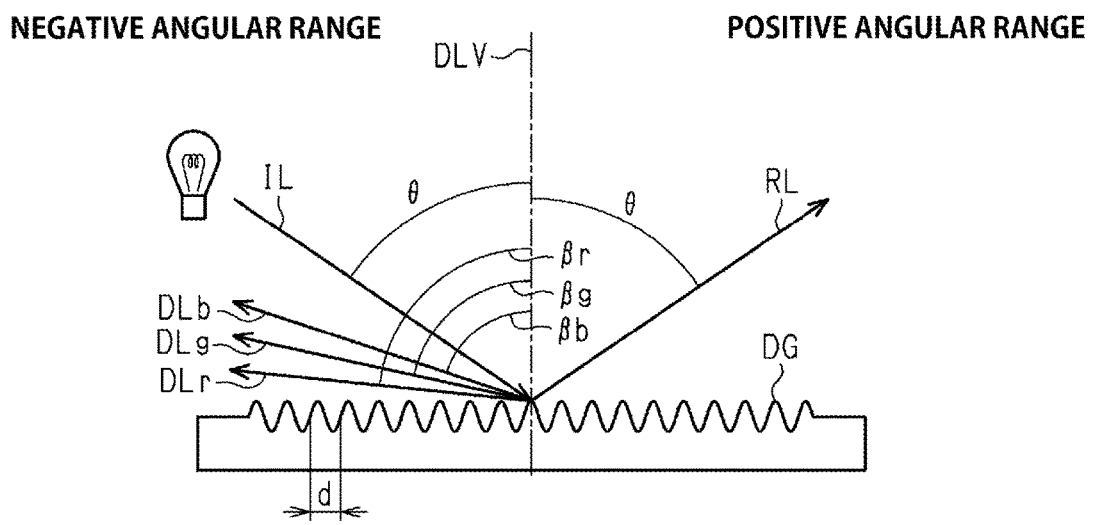
FIG. 6 is an action diagram illustrating directions of first-order diffracted light emitted from a diffraction grating.

As illustrated in FIG. 6, the diffraction grating DG has the pitch d in the foregoing exemplified range. That is, the pitch d of the diffraction grating DG is 286 nm or more and 1000 nm or less, for example. In this case, the irradiation light IL emitted by the irradiation unit is white light as an example of visible light, too. When the irradiation light IL is applied to the diffraction grating DG at the irradiation angle θ, the diffraction grating DG emits red diffracted light DLr, green diffracted light DLg, and blue diffracted light DLb as first-order diffracted light. An emission angle βr of the red diffracted light DLr, an emission angle βg of the green diffracted light DLg, and an emission angle βb of the blue diffracted light DLb are included in the negative angular range with respect to a front-view direction DLV of the diffraction grating DG. For example, when the irradiation angle θ is 50° and the pitch d is 330 nm, the emission angle βg of the green diffracted light DLg with a wavelength of 540 nm is −60°. Therefore, when the irradiation unit is positioned in the negative angular range and the imaging unit is positioned in the negative angular range, the images formed by the diffracted light of the colors DLr, DLg, and DLb are captured by the imaging unit.

When the pitch d of the diffraction grating DG is 1000 nm, the emission angle of the first-order diffracted light is about −10°, and the difference value between the emission angle βr of the red diffracted light DLr and the emission angle βb of the blue diffracted light DLb is about 7°. When the pitch d of the diffraction grating DG is 667 nm, the emission angle of the first-order diffracted light is about −15°, and the difference value between the emission angle βr of the red diffracted light DLr and the emission angle βb of the blue diffracted light DLb is about 11°. When the pitch d of the diffraction grating DG is 500 nm, the emission angle of the first-order diffracted light is about −20°, and the difference value between the emission angle βr of the red diffracted light DLr and the emission angle βb of the blue diffracted light DLb is about 15°. When the pitch d of the diffraction grating DG is 400 nm, the emission angle of the first-order diffracted light is about −25°, and the difference value between the emission angle βr of the red diffracted light DLr and the emission angle βb of the blue diffracted light DLb is about 20°. When the pitch d of the diffraction grating DG is 333 nm, the emission angle of the first-order diffracted light is about −30°, and the difference value between the emission angle βr of the red diffracted light DLr and the emission angle βb of the blue diffracted light DLb is about 25°. When the pitch d of the diffraction grating DG is 286 nm, the emission angle of the first-order diffracted light is about −35°, and the difference value between the emission angle βr of the red diffracted light DLr and the emission angle βb of the blue diffracted light DLb is about 32°.

As described above, in the identification target 110 identified by the identification apparatus, the diffraction grating 231 has the pitch d in which the diffracted light is emitted in the negative angular range. Therefore, during identification of whether the optical device matches the identification target 110, positioning the irradiation unit in the negative angular range and positioning the imaging unit in the negative angular range makes it possible to capture the image formed from the diffracted light by the imaging unit. The first-order diffracted light includes the red diffracted light DLr, the green diffracted light DLg, and the blue diffracted light DLb. As the distance between the diffraction grating DG and the imaging unit is larger, the diffracted light of the colors DLr, DLg, and DLb is recorded as light of more different colors by the imaging unit. On the other hand, as the distance between the diffraction grating DG and the imaging unit is smaller, the diffracted light of the colors DLr, DLg, and DLb is recorded as light of more mixed colors by the imaging unit.

[Identification Apparatus 310]

Figure 7:
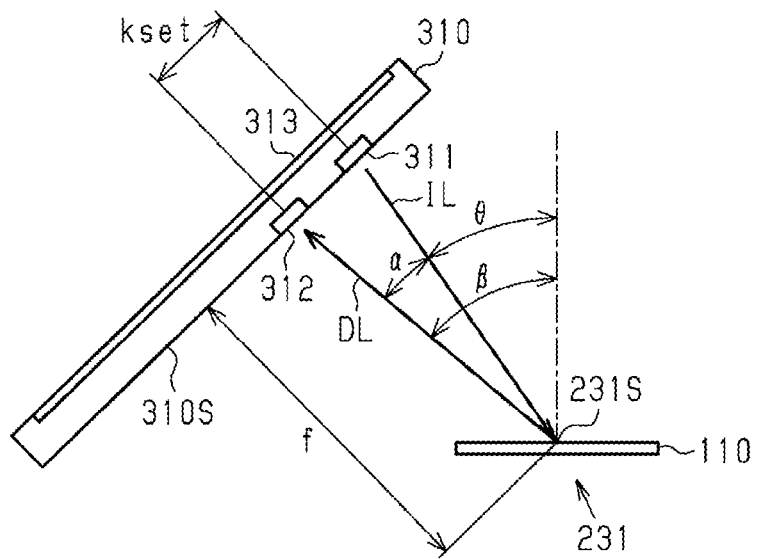
FIG. 7 is a configuration diagram illustrating a configuration of an identification apparatus or system at a position relative to the identification target.

With reference to FIG. 7, description will be given of relative positions of the identification target 110 including the diffraction grating 231 that emits the diffracted light in the negative angular range and an identification apparatus 310 to identify whether an optical device matches the identification target 110. The optical device may be attached to various types of articles. The various types of articles include valuable securities such as stock certificates, national government bonds, bills, merchandise coupons, gift coupons, travel coupons, and bill of lading, advance payment certificates such as pre-paid cards, credit cards, pharmaceuticals, food, brand-name items, and cash vouchers such as bank notes.

As illustrated in FIG. 7, the identification apparatus 310 includes an irradiation unit 311 and an imaging unit 312 on a mounting surface 310S as an example of the second face. The identification apparatus 310 includes a display 313 on the surface facing away from the mounting surface 310S. The identification apparatus 310 is a computer system that stores an identification program in a medium readable by the computer system. The identification program is a program for identifying whether the optical device matches the identification target 110. The identification apparatus 310 reads and executes the identification program stored in the readable medium, to thereby perform the identification described above.

The identification program may be transmitted from a computer system storing the identification program in a storage device to another computer system via a transmission medium or by transmission waves in the transmission medium. The identification program may be a program that implements some of the functions of the identification apparatus 310. Further, the identification program may be a differential program that implements the functions of the identification apparatus 310 by combination with another program already stored in the identification apparatus 310. The identification apparatus 310 is embodied as a portable terminal such as a smartphone or a tablet terminal.

The irradiation unit 311 emits white light that is an example of visible light as the irradiation light IL. The irradiation light IL is emitted in a direction substantially normal to the mounting surface 310S. The irradiation unit 311 is an electronic flash unit such as a light-emitting diode, a xenon lamp, or the like. The irradiation unit 311 is a device that continuously applies light to the identification target 110 or an optical device, or is a device that applies light to the identification target 110 or an optical device only for a short time.

The imaging unit 312 captures an image formed by light toward the imaging unit 312. The imaging unit 312 includes an imaging optical system and a solid-state imaging element. The imaging optical system includes imaging lenses such as a positive refraction lens and a negative refraction lens, a diaphragm, and a drive mechanism for driving these lenses and diaphragm. The solid-state imaging element is an image sensor such as a CMOS sensor or a CCD sensor. The imaging unit 312 is driven so that an image point of the identification target 110 or an optical device lies in an image plane of the image sensor. The display 313 displays various kinds of information such as an image formed by an optical device and captured by the imaging unit 312.

On the mounting surface 310S, the spacing between the irradiation unit 311 and the imaging unit 312 is a rated distance kset. The rated distance kset is a distance that is uniquely determined by the specifications of the identification apparatus 310. The rated distance kset is invariant during identification of whether an optical device matches the identification target 110, and takes a constant value inherent to the identification apparatus 310. The rated distance kset is 5 mm or more and 20 mm or less, for example. With the rated distance kset of 5 mm or more and 20 mm or less, it is possible to suppress the identification apparatus 310 from being larger in size due to the large spacing between the irradiation unit 311 and the imaging unit 312 and enhance the general versatility of the identification apparatus 310.

A surface 231S of the identification target 110 is an example of the first face on which the diffraction grating 231 is located. The spacing between the surface 231S of the identification target 110 and the imaging unit 312 is an operating distance f. The operating distance f is changeable by the user of the identification apparatus 310 or an instrument used in the identification apparatus 310 during identification of whether an optical device matches the identification target 110. The operating distance f is longer than the rated distance kset and is 50 mm or more and 200 mm or less, for example.

The irradiation light IL emitted by the irradiation unit 311 enters the surface 231S of the identification target 110. The diffracted light DL emitted by the diffraction grating 231 travels from the surface 231S of the identification target 110 toward the mounting surface 310S. In this case, when the following equation (2) is satisfied, an image formed by n-order (n is an integer greater than or equal to 1) diffracted light DL can be captured by the imaging unit 312.

$$d = n\lambda/(\sin(\beta-\alpha) + \sin\beta) \qquad \text{equation (2)}$$

$$\tan\alpha = k\text{set}/f \qquad \text{equation (3)}$$

In the above equation (2), the irradiation angle θ is an angle formed by the front view direction of the identification target 110 and the irradiation direction in which the irradiation light IL travels. In addition, during identification of whether an optical device matches the identification target 110, the irradiation angle θ is an angle formed by the front view direction of the optical device and the irradiation direction of the irradiation light IL. The irradiation angle θ corresponds to an angle formed by the surface 231S of the identification target 110 and the mounting surface 310S of the identification apparatus 310. Further, during identification of whether an optical device matches the identification target 110, the irradiation angle θ also corresponds to an angle formed by the surface of the optical device and the mounting surface 310S of the identification apparatus 310.

In the above equation (2), the imaging angle β is an angle formed by the front view direction of the identification target 110 and the emission direction in which the diffracted light DL travels. In addition, during identification of whether the optical device matches the identification target 110, the imaging angle β is an angle formed by the front view direction of the optical device and the emission direction of the diffracted light DL.

In the above equation (2), the operating angle α is an angle formed by a straight line connecting the irradiation unit 311 and the identification target 110 and a straight line connecting the imaging unit 312 and the identification target 110? In addition, during identification of whether an optical device matches the identification target 110, the operating angle α is an angle formed by a straight line connecting the irradiation unit 311 and the optical device and a straight line connecting the imaging unit 312 and the optical device. The operating angle α is an angle satisfying the above equation (3). The operating angle α varies depending on a change in the operating distance f because the rated distance kset is constant.

In this case, during identification of whether an optical device matches the identification target 110, the pitch d described above is a pitch dset that is inherent to the identification target 110 and that is preset to the identification target 110. The wavelength λ is a typical wavelength of the diffracted light emitted by the identification target 110. For example, when the visible light wavelength band is 400 nm or more and 800 nm or less, the wavelength λ is a wavelength kset (=600 nm) as a central wavelength of the visible light wavelength band. In other words, the rated distance kset takes a value inherent to the identification apparatus 310, while the pitch dset and the wavelength λset take values inherent to the identification target 110. The rated distance kset, pitch dset, and wavelength λkset are kept at predetermined values during identification of whether the optical device matches the identification target 110. Therefore, when the imaging angle β and the operating distance f satisfy the following equations (4) and (5), the image formed by the first-order diffracted light can be captured by the imaging unit 312.

In this case, when the angle formed by the normal to the surface of the optical device and a direction of the diffracted light that is emitted from the surface of the optical device and is entering the imaging unit 312 is kept at a predetermined value during imaging, the imaging angle β is also kept at a predetermined value. For example, as the distance of the mounting surface 310S to the optical device increases with the angle between the normal to the surface of the optical device and a direction of the diffracted light that is emitted from the surface of the optical device and is entering the imaging unit 312 kept at a predetermined value, the irradiation angle θ increases while the imaging angle β is kept at a predetermined value. In addition, as the distance of the mounting surface 310S to the optical device decreases with the angle between the normal to the surface of the optical device and a direction of the diffracted light that is emitted from the surface of the optical device and is entering the imaging unit 312 kept at a predetermined value, the irradiation angle θ decreases while the imaging angle β is kept at a predetermined value. As a result, when imaging is performed at the imaging angle β kept at a predetermined value or when only the image at the imaging angle β of a predetermined value is used for identification and only the operating distance f is adjusted to satisfy the following equations (4) and (5), the image formed by the first-order diffracted light can be captured by the imaging unit 312.

$$d\text{set}=\lambda\text{set}/(\sin(\beta-\alpha)+\sin \beta) \quad \text{equation (4)}$$

$$\tan \alpha = k\text{set}/f \quad \text{equation (5)}$$

Next, configurations of processing units included in the identification apparatus 310 will be described with reference to FIG. 7. Hereinafter, an example of identification of whether an optical device matches the identification target 110 will be described. The identification target 110 is a device that emits the diffracted light DL in the negative angular range as described above.

In addition, the imaging angle β is kept at a reference angle during identification of whether the optical device matches the identification target 110. The reference angle is preset in a range of 20° or more and 70° or less, for example. As described above, when the two parameters of the imaging angle β and the operating distance f satisfy the above equations (4) and (5), the image formed by the diffracted light DL can be captured by the imaging unit 312. The imaging angle β corresponds to an angle formed between the normal to the surface 231S of the identification target 110 and a direction of the diffracted light that is emitted from the surface 231S and is entering the imaging unit 312. The imaging angle β is kept at the reference angle using a jig such as a stage to set the imaging angle β to the reference angle. Then, while the identification apparatus 310 is supported by the jig, the identification apparatus 310 performs imaging. As another method for keeping the imaging angle β at the reference angle, the identification apparatus 310 includes a functional unit that calculates the imaging angle β, and the user of the identification apparatus 310 adjusts the posture of the identification apparatus 310 to set the current imaging angle β to the reference angle. The identification apparatus 310 performs identification assuming that, with the two parameters of the imaging angle β and the operating distance f, the imaging angle β is the reference angle.

Figure 8:
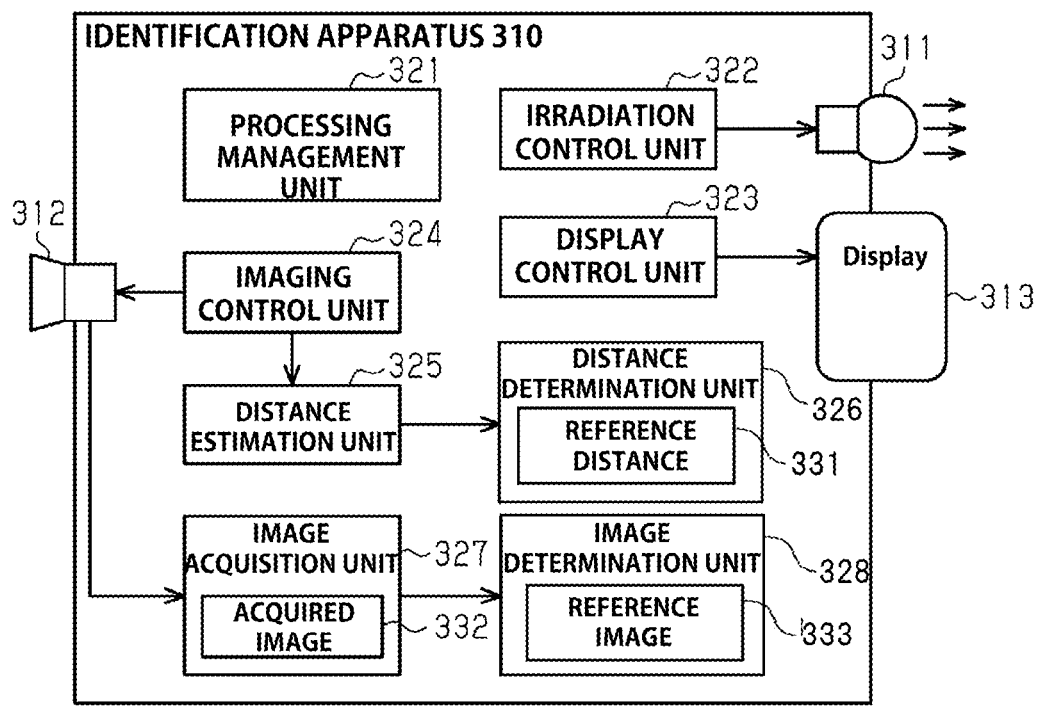
FIG. 8 is a block diagram illustrating a functional configuration of the identification apparatus or system.

As illustrated in FIG. 8, the identification apparatus 310 includes the irradiation unit 311, the imaging unit 312, and the display 313 described above. The identification apparatus 310 also includes a processing management unit 321 as an example of the identification unit, an irradiation control unit 322, a display control unit 323, and an imaging control unit 324, a distance estimation unit 325 as an example of the estimation unit, a distance determination unit 326 as an example of the first determination unit, an image acquisition unit 327, and an image determination unit 328 as an example of the second determination unit. The processing management unit 321 may not include a central processing unit and a memory to perform all various types of processing described later, with software. For example, the processing management unit 321 may include dedicated hardware (application-specific integrated circuit: ASIC) that executes at least part of the various types of processing. That is, the processing management unit 321 may be configured as a circuit including one or more dedicated hardware circuits, such as ASIC, one or more processors (microcomputers) that operate according to computer programs (software), or a combination thereof. The irradiation control unit 322, the display control unit 323, the imaging control unit 324, the distance estimation unit 325, the distance determination unit 326, the image acquisition unit 327, the image determination unit 328 may be implemented as a dedicated hardware circuit that executes various types of processing, one or more processors (microcomputers) operating according to computer programs (software), or a combination thereof, for example. The circuit including the hardware circuit, the processor, or the combination thereof can constitute two or more functional units. The memory, that is, the computer-readable medium, includes every usable medium that is accessible from general-purpose or dedicated computers.

The processing management unit 321 reads an identification program for identifying whether an optical device matches the identification target 110 and executes the identification program. The processing management unit 321 manages the processes performed by the control units 322, 323, and 324, the estimation performed by the distance estimation unit 325, the acquisition of an image by the image acquisition unit 327, and the determinations made by the determination units 326 and 328. The processing management unit 321 separately instructs the control units 322, 323, and 324 to start or stop the processes. The processing management unit 321 also instructs the distance estimation unit 325 to estimate the operating distance f. The processing management unit 321 also separately instructs the determination units 326 and 328 to perform various determinations. The processing management unit 321 uses the results of the determinations by the determination units 326 and 328 to identify whether the optical device matches the identification target 110.

The irradiation control unit 322 sets irradiation conditions such as the intensity of the irradiation light IL. The irradiation control unit 322 sets the irradiation conditions such that, as the ambient brightness during imaging of the surface of the optical device is higher, the intensity of the irradiation light IL is higher. The irradiation control unit 322 controls the driving of the irradiation unit 311 such that the irradiation unit 311 outputs the irradiation light IL based on the irradiation conditions. The processing management unit 321 manages the timing at which the irradiation unit 311 applies the irradiation light IL and a period of irradiation with the irradiation light IL by the irradiation unit 311 through control by the irradiation control unit 322.

The display control unit 323 sets a screen to be displayed on the display 313. As the screen to be displayed on the display 313, the display control unit 323 sets any of a setting screen, a progress screen, and a notification screen. The setting screen includes an input screen for inputting imaging conditions, a confirmation screen for prompting the user to confirm the imaging conditions, and an operation screen for prompting the imaging of the optical device. The progress screen includes an imaging screen on which an image captured by the imaging unit 312 is displayed each time, a reference screen on which the captured image and an image used for comparison with the captured image is displayed, and a determination screen on which results of a determination for use in identification is displayed each time. The notification screen includes a screen indicating that the optical device is identified as the identification target, a screen indicating that the optical device is not identified as the identification target, and a screen indicating that an error has occurred in a process necessary for identification. The display control unit 323 controls driving of the display 313 such that the set screen is displayed on the display 313. The processing management unit 321 manages the timings for displaying the screens on the display 313 through control by the display control unit 323.

The imaging control unit 324 sets conditions for imaging by the imaging unit 312. The conditions for imaging include shutter speed, aperture value, still image mode, moving image mode, depth of focus, and sensitivity of the imaging element. The imaging control unit 324 controls driving of the imaging unit 312 such that the imaging unit 312 captures an image based on the conditions for imaging.

The imaging control unit 324 outputs optical parameters necessary for estimation of the operating distance f to the distance estimation unit 325. The optical parameters necessary for estimation of the operating distance f include the driving amounts and defocus amounts of lenses in the imaging optical system for causing the image point of the optical device to lie in the image plane. The imaging control unit 324 uses the depth from focus (DFF) method to calculate a contrast at one point in the image and displaces the image point. When determining that the in-focus state is nearly attained, the imaging control unit 324 stops the displacement of the image point, and outputs the driving amounts and defocus amounts of the lenses at that time as optical parameters to the distance estimation unit 325. The imaging control unit 324 also uses the depth from defocus (DFD) method, for example, to capture two images at two different image points and calculates the image point from the captured images and the parameters of the lenses. The imaging control unit 324 then outputs, to the distance estimation unit 325, the driving amounts and defocus amounts of the lenses for displacing the image point to the image plane as optical parameters.

In the case of setting the still image mode as a condition for imaging, each time an in-focus image is captured, the imaging control unit 324 outputs the optical parameters that were used when the in-focus image was captured to the distance estimation unit 325. In this case, at each output of the optical parameters, the imaging control unit 324 transfers the images captured using the optical parameters from the imaging unit 312 to the image acquisition unit 327 in the order of image capture. In the case of setting the moving image mode as a condition for imaging, each time an image constituting a moving image is captured, the imaging control unit 324 outputs the optical parameters that were used when capturing the image to the distance estimation unit 325. In this case, at each output of the optical parameters, the imaging control unit 324 transfers the images captured using the optical parameters from the imaging unit 312 to the image acquisition unit 327 in the order of image capture.

The distance estimation unit 325 calculates and outputs the estimated value of the operating distance f. The distance estimation unit 325 calculates the estimated value using the optical parameters and the lens parameters. The optical parameters are values outputted from the imaging control unit 324 at the time of image capture. The lens parameters include the focal lengths of the lenses and the distances between principal points of the lenses in the imaging optical system. That is, the distance estimation unit 325 calculates the estimated value from the driving amounts and defocus amounts of the in-focus lenses. The distance estimation unit 325 may also calculate the estimated value only from the optical parameters outputted from the imaging control unit 324. The distance estimation unit 325 outputs the calculated estimated values to the distance determination unit 326 in the order of image capture.

The distance determination unit 326 determines whether each of the estimated values matches the reference distance 331. The estimated value used by the distance determination unit 326 for determination is a calculated value outputted from the distance estimation unit 325. The distance determination unit 326 reads the reference distance 331 from the storage unit storing the reference distance 331. The reference distance 331 used by the distance determination unit 326 for identification is a value unique to the identification target 110. The reference distance 331 is the operating distance f that satisfies the above equations (4) and (5) during imaging of the identification target 110, and is a value inputted in advance to the identification apparatus 310 before the identification of whether the optical device matches the identification target 110. The reference distance 331 may be set within a predetermined range including the operating distance f satisfying the above equations (4) and (5). The distance determination unit 326 outputs the determination results indicating whether the estimated values match the reference distance 331 to the processing management unit 321 in the order of image capture.

The image acquisition unit 327 acquires the images transferred from the imaging unit 312 and stores the acquired images as acquired images 332. Among the images captured in the imaging unit 312, the images acquired by the image acquisition unit 327 are data indicating images of which the estimated values are to be calculated. That is, for the images acquired by the image acquisition unit 327, the distance determination unit 326 determines the estimated values at the time of capturing the images. The images acquired by the image acquisition unit 327 are gray images, color images, or RAW images. The image acquisition unit 327 transfers the acquired images to the image determination unit 328 in a form that can be analyzed by the image determination unit 328 in the order of image capture.

The image determination unit 328 determines whether the images transferred from the image acquisition unit 327 match the reference image 333 as an example of the reference image. The reference image 333 is data indicating an image to be obtained by the optical device that is identified as the identification target 110. The image to be obtained is generated from the result of imaging of the identification target 110 by the identification apparatus 310 under the conditions that the imaging angle β is the reference angle and the operating distance f is the reference distance 331. The reference image 333 is modeled data of the image obtained from the identification target 110. It is determined whether each of the images transferred from the image acquisition unit 327 matches the reference image 333 by calculating the degree of similarity between the reference image 333 and the acquired image 332 by template matching. Otherwise, the determination on whether each of the images transferred from the image acquisition unit 327 matches the reference image 333 may include a determination on whether there is a match in the distribution of luminance histogram. The image determination unit 328 outputs results of determination by the image determination unit 328 to the processing management unit 321 in the order of image capture.

For one acquired image, the processing management unit 321 uses the result of determination by the distance determination unit 326 and the result of determination by the image determination unit 328 to identify whether the optical device matches the identification target 110. The processing management unit 321 includes conditions for identifying the optical device as the identification target 110. The conditions included in the processing management unit 321 include a condition that the distance determination unit 326 determines that the estimated value matches the reference distance 331 and a condition that the acquired image 332 matches the reference image 333, for one acquired image. When the conditions included in the processing management unit 321 are satisfied, the processing management unit 321 identifies the optical device as the identification target 110. On the other hand, when at least one of the condition that the distance determination unit 326 determines that the estimated value does not match the reference distance 331 and the condition that the acquired image 332 does not match the reference image 333 is satisfied for one acquired image, the processing management unit 321 determines that it is impossible to identify the optical device as the identification target 110.

[Identification Method]

An identification method performed by the identification apparatus 310 will now be described. The process flow of the identification in the still image mode is almost the same as the process flow of the identification in the moving image mode. Thus, hereinafter, the identification in the still image mode will be mainly described and duplicated description of overlaps between the process flow in the still image mode and the process flow in the moving image mode will be omitted.

When an application is activated, the identification apparatus 310 starts a process for identifying whether the current optical device matches the identification target 110. First, the processing management unit 321 causes the display 313 to display the operation screen for prompting imaging of the surface of the current optical device through control by the display control unit 323. When the operation screen is displayed, the processing management unit 321 starts imaging of the current optical device upon acceptance of an operation by the user on the operation screen. That is, the processing management unit 321 causes the irradiation unit 311 to apply the irradiation light IL through control by the irradiation control unit 322. The processing management unit 321 drives the imaging unit 312 to sequentially capture in-focus images in the imaging unit 312 through control by the imaging control unit 324. When each of the images is captured, the processing management unit 321 causes the imaging control unit 324 to output optical parameters necessary for the estimation of the operating distance f to the distance estimation unit 325 through control by the imaging control unit 324.

Figure 9:
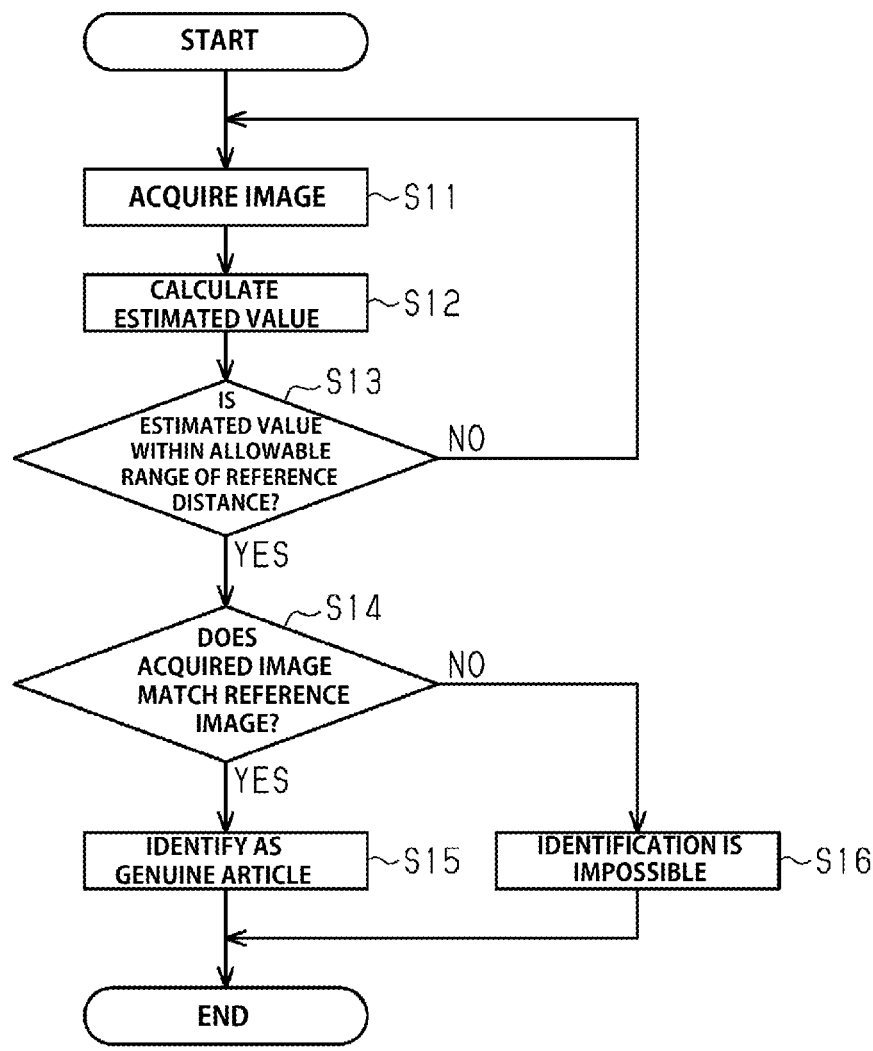
FIG. 9 is a flowchart of a process performed by the identification apparatus or system.

Then, as illustrated in FIG. 9, the processing management unit 321 causes the imaging unit 312 to sequentially transfer the captured images to the image acquisition unit 327 through control by the imaging control unit 324. The image acquisition unit 327 sequentially acquires the images transferred by the imaging unit 312 (step S11). The processing management unit 321 causes the distance estimation unit 325 to sequentially calculate the estimated values of the images using the optical parameters outputted from the imaging control unit 324 and the lens parameters (step S12). The processing management unit 321 causes the distance determination unit 326 to sequentially determine whether the estimated values outputted from the distance estimation unit 325 match the reference distance 331 (step S13). Then, the processing management unit 321 repeats the capture of images by the imaging unit 312, the acquisition of the images by the image acquisition unit 327, the calculation of estimated values by the distance estimation unit 325, and the determination by the distance determination unit 326 through the processes performed by the imaging control unit 324, the distance estimation unit 325, and the distance determination unit 326 (NO at step S13) until it is determined that the estimated value matches the reference distance 331.

If it is determined that the estimated value matches the reference distance 331 (YES at step S13), the processing management unit 321 determines whether the acquired image 332 matches the reference image 333 through the process performed by the image determination unit 328 (step S14). In this case, the acquired image 332 used by the image determination unit 328 for determination is an example of a determination target and is an image captured with specific optical parameters. The specific optical parameters are optical parameters used in the calculation of the estimated value determined as matching the reference distance 331. If it is determined that the acquired image 332 matches the reference image 333, the processing management unit 321 identifies the current optical device as the identification target 110. The processing management unit 321 causes the display 313 to display the fact that the current optical device is identified as an authentic article through control by the display control unit 323 (step S15). On the other hand, if it is not determined that the acquired image 332 matches the reference image 333, the processing management unit 321 causes the display 313 to display the fact that it is impossible to identify the current optical device as the identification target 110, that is, the fact that identification of the current optical device is impossible (step S16).

As above, according to the foregoing embodiment, the following advantageous effects are obtained:

(1) The identification of whether an optical device matches the identification target 110 reflects the suitability of the imaging angle that corresponds to the angle formed by the normal to the surface of the optical device and a direction of the diffracted light that is emitted from the surface of the optical device and is entering the imaging unit 312 and the suitability of the operating distance f that is the distance between the surface of the optical device and the imaging unit 312. Consequently, the result of the identification reflects the suitability of the relative positions of the imaging unit 312 and the irradiation unit 311 to the optical device. Therefore, it is possible to enhance the accuracy of the identification of whether the optical device matches the identification target.

(2) The imaging unit 312 and the imaging control unit 324 for imaging an optical device generate the optical parameters for calculating the estimated values. Accordingly, it is possible to simplify the configuration of the identification apparatus 310 as compared to a configuration in which a functional unit for collecting information for calculating the estimated value is separately provided in the identification apparatus 310.

(3) The distance between the irradiation unit 311 and the imaging unit 312 is 5 mm or more and 20 mm or less on the mounting surface 310S, which makes it possible to use a general-purpose portable device including the irradiation unit 311 and the imaging unit 312 as the identification apparatus 310.

(4) The determination by the distance determination unit 326 is performed before the determination by the image determination unit 328. Then, for the acquired image 332 at the operating distance f of which the distance determination unit 326 determines that the estimated value matches the reference distance 331, it is determined whether the acquired image 332 matches the reference image 333. This makes it possible to shorten the time necessary for identifying whether the optical device matches the identification target 110 as compared to a configuration in which the determination on whether the acquired image 332 matches the reference image 333 is performed on all the acquired images 332.

The foregoing embodiment may be modified as described below.

[Determination Timing]

The processing management unit 321 may change the order of performing the determination using the estimated value and the determination using the acquired image 332. In such a changed order of determination, it is possible to obtain advantageous effects similar to (1) to (3) described above. In addition, it is possible to shorten the time necessary for identifying whether the optical device matches the identification target 110 as compared to a configuration in which the determination on whether the estimated value matches the reference distance 331 and the determination on whether the captured image matches the reference image 333 are performed on each of the images. Further, it is possible to further enhance the accuracy of the identification based on the acquired image 332 that is determined as matching the reference image 333, by reflecting the determination using the estimated value.

Figure 10:
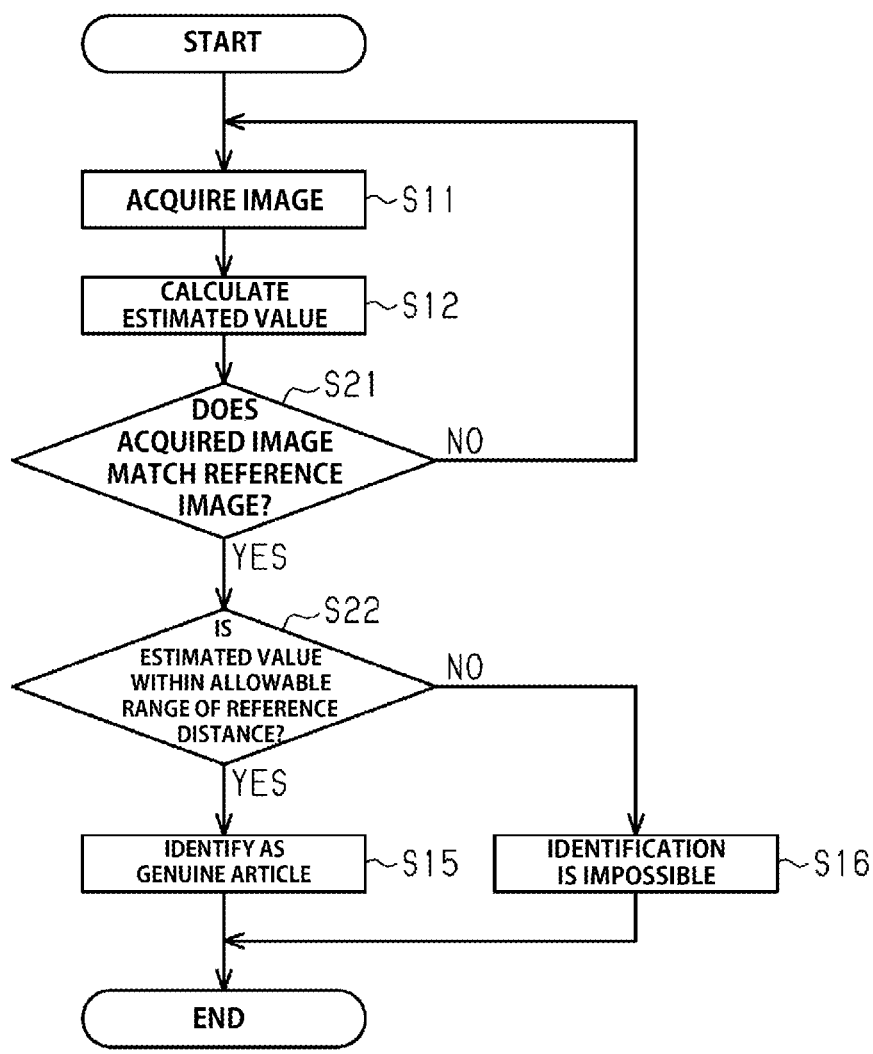
FIG. 10 is a flowchart of a process performed by the identification apparatus or system.

Specifically, as illustrated in FIG. 10, after steps S11 and S12, the processing management unit 321 determines whether each of the acquired images 332 matches the reference image 333 through process performed by the image determination unit 328 (step S21). In this case, the acquired images 332 used by the image determination unit 328 for the determination are images acquired by the image acquisition unit 327. Then, the processing management unit 321 repeats the capture of images by the imaging unit 312, the acquisition of the images by the image acquisition unit 327, the calculation of estimated values by the distance estimation unit 325, and the determination by the image determination unit 328 through the processes performed by the imaging control unit 324, the image acquisition unit 327, and the image determination unit 328 until it is determined that the acquired image 332 matches the reference image 333 (NO at step S21).

If it is determined that the acquired image 332 matches the reference image 333 (YES at step S21), the processing management unit 321 causes the distance determination unit 326 to determine whether the estimated value outputted by the distance estimation unit 325 matches the reference distance 331 (step S22). In this case, the estimated value used by the distance determination unit 326 for the determination is an example of a determination target and is an estimated value obtained from the optical parameters used when capturing a specific image. The specific image is the acquired image 332 that is determined as matching the reference image 333. If it is determined that the estimated value matches the reference distance 331, the processing management unit 321 identifies the current optical device as the identification target 110. On the other hand, if it is determined that the estimated value does not match the reference distance 331, the processing management unit 321 causes the display 313 to display the fact that it is impossible to identify the current optical device as the identification target 110, that is, identification of the current optical device is impossible (step S16).

The imaging control unit 324 sequentially transfers the captured images from the imaging unit 312 to the image acquisition unit 327 in the order of image capture, and outputs the optical parameters during image capture to the distance estimation unit 325 in the order of image capture. In this case, the image determination unit 328 determines whether the acquired image 332 matches the reference image 333 and outputs the results of the determination in the order of capture of the images. The distance determination unit 326 may also determine whether the estimated value matches the reference distance 331 and output the results of the determination in the order of capture of the images. That is, the identification apparatus 310 may be configured to perform, on each of the images in parallel, the determination by the image determination unit 328 on whether the acquired image 332 matches the reference image 333 and the determination by the distance determination unit 326 on whether the estimated value matches the reference distance 331.

The processing management unit 321 may perform the determination using the estimated value and the determination using the acquired image 332 at each time of image capture by the imaging unit 312 through instructions to the imaging control unit 324, the distance estimation unit 325, the distance determination unit 326, the image acquisition unit 327, and the image determination unit 328. That is, the processing management unit 321 may be configured to perform the estimation using the optical parameters by the distance estimation unit 325, the determination using the estimated value by the distance determination unit 326, and the determination using the captured image as the acquired image 332 by the image determination unit 328 at each time of image capture by the imaging unit 312.

[Display Control Unit 323]

The display control unit 323 may display the acquired image 332 and the reference image 333 aligned with each other. In this case, the user of the identification apparatus 310 can review the result of the determination on whether the acquired image 332 matches the reference image 333 by comparison between the acquired image 332 and the reference image 333 on the display 313. The acquired image 332 and the reference image 333 may be aligned horizontally or vertically on the display 313.

[Distance Estimation Unit 325]

The estimation performed by the distance estimation unit 325 is not limited to the passive estimation described above but may be the active estimation. The active estimation is an estimation using a time-of-flight method, for example. According to the time-of-flight method, the identification apparatus 310 includes a laser oscillation source and a detection unit for detecting laser light, and estimates the operating distance f using the time until laser light having been reflected on the identification target 110 or the optical device reaches the detection unit.

[Distance Determination Unit 326]

The reference distance 331 may be calculated in real time by the distance determination unit 326 with an input of the pitch d of the identification target 110 into the identification apparatus 310. However, if the distance determination unit 326 is configured to hold in advance the reference distance 331, it is possible to speed up the determination on whether the estimated value matches the reference distance 331.

The reference distance 331 may be preset within a short-distance range of 20 mm or more and 50 mm or less, for example, depending on a pitch dset of the identification target 110. As the reference distance 331 is shorter, the probability of the irradiation light IL being diffused before reaching the optical device is lower. Therefore, in the configuration in which the reference distance 331 is short, it is possible to ensure the contrast and brightness of the images to be captured in the imaging unit 312, and to reduce the cause of incorrect determination on the images. As the reference distance 331 is shorter, the operating angle α at the reference distance 331 is larger as shown in the above equation (5). As the operating angle α is larger, the pitch dset of the diffraction grating 231 is smaller as shown in the foregoing equation (4). In addition, as the pitch dset is shorter, it is harder to copy or counterfeit the identification target 110. Accordingly, in the configuration in which the identification target 110 is applied to an anti-counterfeiting medium, it is possible to enhance the anti-counterfeiting effect.

[Identification Method]

Figure 11:
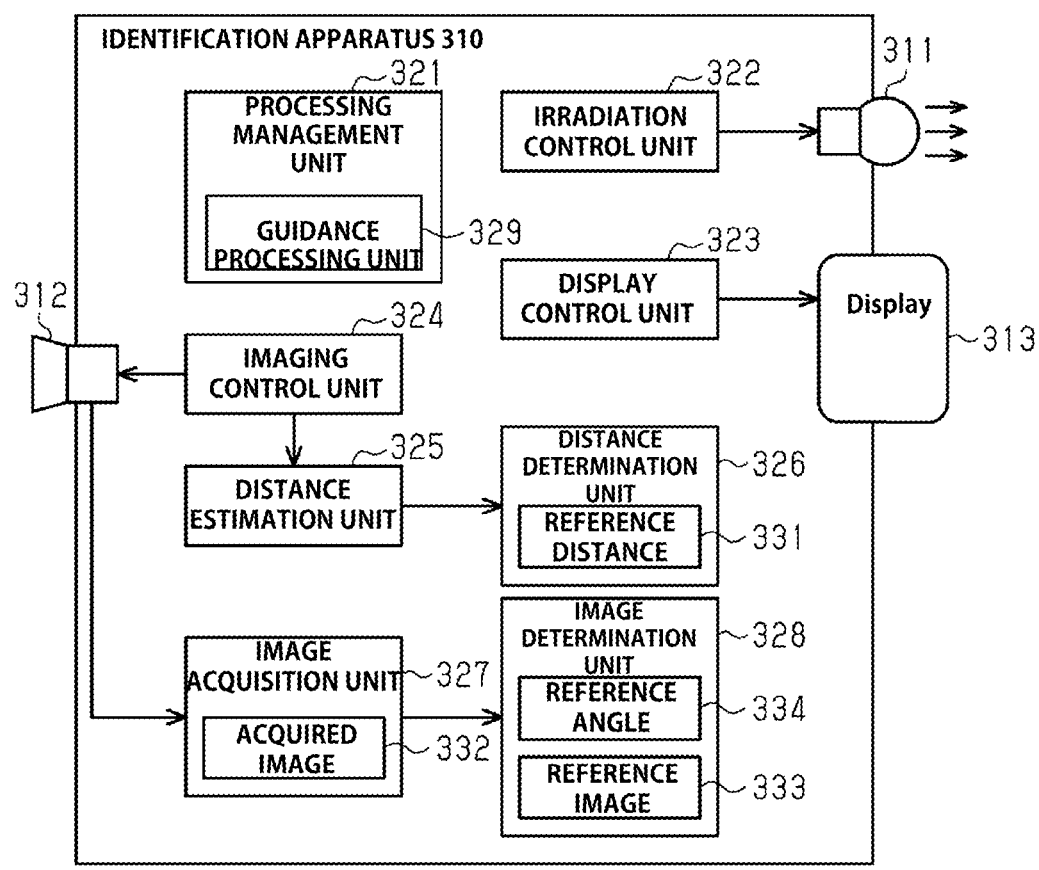
FIG. 11 is a block diagram illustrating a functional configuration of an identification apparatus or system in a modification example.

The identification apparatus 310 may determine whether the two parameters of the imaging angle β and the operating distance f satisfy the above equations (4) and (5), and perform identification based on the result of the determination. That is, in the foregoing embodiment, the identification apparatus 310 assumes the imaging angle β as the predetermined reference angle. However, the identification apparatus 310 is not limited to this. The identification apparatus 310 may also include an angle estimation unit that estimates the imaging angle β. For example, as illustrated in FIG. 11, the image determination unit 328 may include the function of the angle estimation unit described above and perform image processing for calculating a depression angle from the image captured in the imaging unit 312, thereby estimating the imaging angle β.

The identification apparatus 310 may include a storage unit that stores the ranges of the two parameters satisfying the above equations (4) and (5) and an imaging determination unit that performs determination using the ranges stored in the storage unit. In addition, when the imaging determination unit determines that the estimated value calculated by the distance estimation unit 325 and the estimated value calculated by the angle estimation unit are within the stored ranges, the identification apparatus 310 may treat the image captured in the imaging unit 312 as an image to be used for identification.

In this case, the reference image 333 is generated by a modeled algorithm that is derived from a plurality of images of the identification target 110 captured at different imaging angles β and different operating distances f. The image determination unit 328 generates the reference image 333 by applying the estimated value estimated by the distance estimation unit 325 and the estimated value estimated by the angle estimation unit to the modeled algorithm, and uses the generated reference image 333 for the determination.

If it is determined that the estimated value of the operating distance f matches the reference distance and that the acquired image 332 does not match the reference image 333, the identification apparatus 310 may identify the optical device as not being the identification target 110. In addition, if it is determined that the estimated value of the operating distance f does not match the reference distance and that the acquired image 332 matches the reference image 333, the identification apparatus 310 may identify the optical device as not being the identification target 110.

The conditions included in the processing management unit 321 may include, for a plurality of different images, a condition that the distance determination unit 326 determines that the estimated value matches the reference distance 331 and a condition that the image determination unit 328 determines that the acquired image 332 matches the reference image 333. The conditions included in the processing management unit 321 may include, for images at a plurality of different imaging angles β, a condition that the distance determination unit 326 determines that the estimated value matches the reference distance 331 and a condition that the image determination unit 328 determines that the acquired image 332 matches the reference image 333. With these additional conditions, it is possible to further improve the accuracy of the identification of whether the optical device matches the identification target 110.

[Guidance Unit]

As illustrated in FIG. 11, the processing management unit 321 may include a guidance processing unit 329 as an example of the guidance unit. The guidance processing unit 329 causes the display 313 to display guidance on the posture of the identification apparatus 310 during image capture through control of the display control unit 323.

For example, the guidance processing unit 329 obtains the difference between the estimated value and the reference distance 331 through an instruction to the distance determination unit 326. Then, the guidance processing unit 329 causes the display 313 to display the message "the distance between the optical device and the identification apparatus 310 is correct" or "the distance between the optical device and the identification apparatus 310 is not correct" based on the obtained difference through control by the display control unit 323. In addition, the guidance processing unit 329 causes the display 313 to display the message "move the identification apparatus 310 away 1 cm from the optical device" or "move the identification apparatus 310 closer by 1 cm to the optical device" based on the obtained difference through control by the display control unit 323.

For example, the guidance processing unit 329 obtains the difference between the estimated value of the imaging angle β and a reference angle 334 through an instruction to the image determination unit 328. Then, the guidance processing unit 329 causes the display 313 to display the message "the inclination of the identification apparatus 310 is correct" or "the inclination of the identification apparatus 310 is not correct" based on the obtained difference through control by the display control unit 323. In addition, the guidance processing unit 329 causes the display 313 to display the message "tilt the identification apparatus 310 a little" or "raise the identification apparatus 310 a little" based on the obtained difference through control by the display control unit 323.

The guidance processing unit 329 may guide the posture of the identification apparatus 310 by at least one of sound from a sound output unit, vibration from a vibration source, and illumination of an LED light. The guidance processing unit 329 may guide the posture of the identification apparatus 310 by combination of such guidance and display on the display 313.

According to the configuration including the guidance processing unit 329, it is possible to image the optical device in a posture of the optical device 310 suitable for capturing the image to be used in identification, that is, capture the image to be used in identification on favorable conditions for identification. As a result, it is possible to reduce difficulty in identification that would be caused by inability to capture an image formed by first-order diffracted light emitted from the diffraction grating.

[Image]

The image formed by the diffracted light DL may include codes other than graphics and patterns. In addition, the image formed by the diffracted light DL may be a code. The code is information indicating the type of a product to which the optical device is to be attached, the identification number of a product to which the optical device is to be attached, the type of the optical device, the identification number of the optical device, or the like. The code is mechanically readable information including characters such as numbers, code of a geometrical shape, code of a planar shape, bar code, two-dimensional barcode, or the like. In this case, the identification apparatus 310 may include a separate function that specifies the type of a product or the type of an optical device from the code. In addition, the identification apparatus 310 may transmit the code obtained from the image formed by the diffracted light to an external device having the function to specify the type of a product or the type of an optical device from the code.

The identification target 110 may include support information necessary for imaging the surface of the identification target 110 as a code that is capable of being imaged by the imaging unit 312. The support information is at least one of the reference angle and the reference distance 331. In this case, the identification apparatus 310 includes a reading unit that reads the support information from the image captured by the imaging unit 312. Then, the processing management unit 321 causes the display 313 to display the support information read by the reading unit through control by the display control unit 323, thereby prompting the user to perform image capturing at the reference angle and the reference distance 331. According to the configuration using such a code, it is possible to shorten the time necessary for identifying whether the optical device matches the identification target 110.

[Identification Target]

The display part 111 of the identification target 110 may also be configured to use retroreflective characteristics by a spherical structure in addition to the diffraction grating 231. The display part 111 of the identification target 110 may include fine inclined surfaces with a gradient such that the inclined surfaces are aligned with a pitch permitting emission of diffracted light in a negative angular range, and the inclined surfaces have reflective characteristics of emitting light in the negative angular range or the positive angular range. The identification target 110 may be configured to show structural colors using propagation of surface plasmons. The identification target 110 may further include a multi-layer interference film in which a plurality of thin films different in refractive index are laminated, a flake-like pigment obtained by crushing a multi-layer interference film, fine particles that develop an interference phenomenon by being covered with a thin film, a liquid crystal material, quantum dots such as silver nanoparticles, and an optical functional unit formed therefrom.

As above, in brief, the identification target 110 is configured such that the display part 111 includes the diffraction grating 231 that emits diffracted light in the negative angular range, and the identification target 110 may be further configured to emit light other than the diffracted light, in addition to the diffraction grating 231.

The identification target 110 or the optical device may include a louver layer on the surface of the diffraction grating 231. The louver layer includes a large number of wall surfaces having a light shielding property and disposed parallel to each other. Each of the wall surfaces defines a slit-like opening extending in a direction in which the irradiation light IL travels and a direction in which the diffracted light travels. That is, the louver layer permits propagation of the irradiation light IL and propagation of the diffracted light DL, but prevents the entry of light other than the irradiation light IL into the diffraction grating 231 and the emission of light other than the diffracted light DL toward the imaging unit 312. The identification target 110 including the louver layer and the optical device including the louver layer suppress incorrect identification by light other than the diffracted light, thereby further enhancing the accuracy of identification of whether the optical device matches the identification target.

The identification of whether the optical device matches the identification target 110 is applicable to identification of whether the optical device matches a genuine identification target 110. The identification of whether the optical device matches the identification target 110 is also applicable to identification of whether he optical device matches the earliest identification target 110, identification of whether the optical device matches the copied identification target 110, and identification of whether the optical device matches a counterfeited identification target.

[Identification Apparatus]

Figure 12:
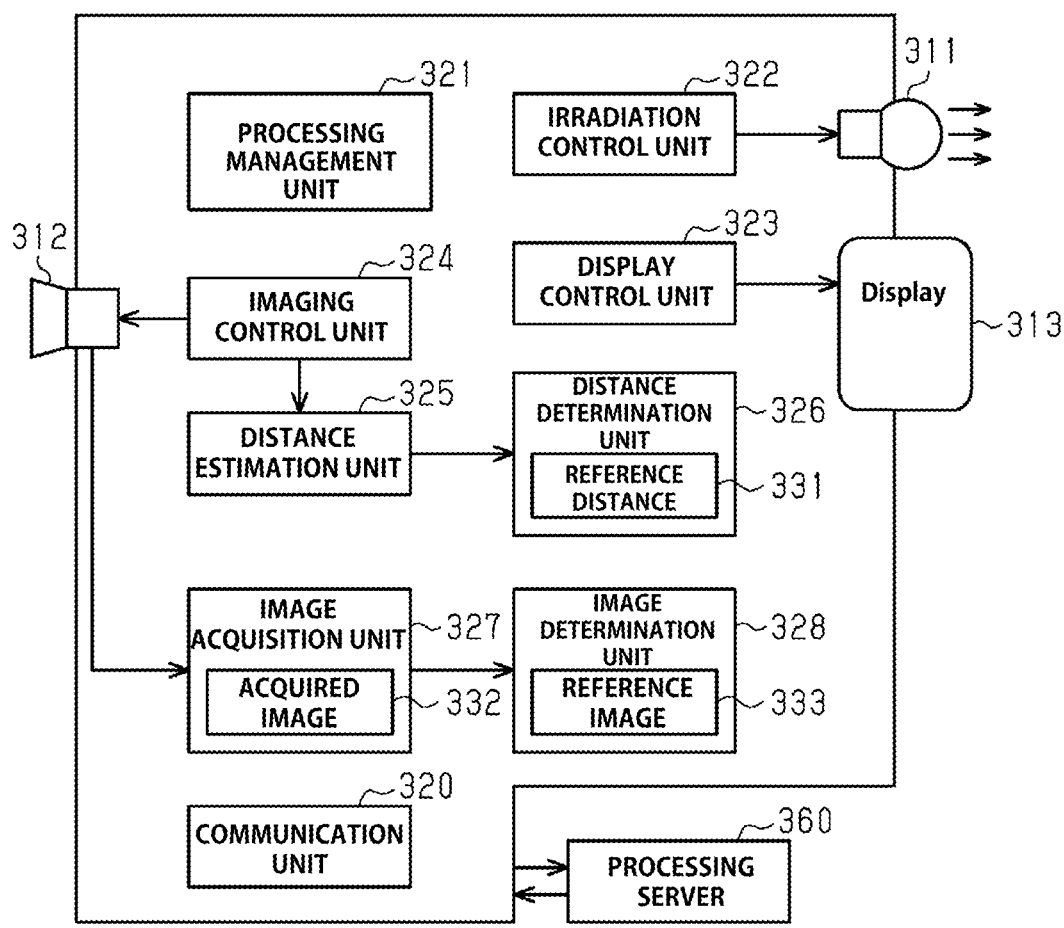
FIG. 12 is a block diagram illustrating a functional configuration of an identification apparatus or system in a modification example.

As illustrated in FIG. 12, the identification apparatus may be configured from a terminal device 350 and a processing server 360. The terminal device 350 includes an irradiation unit 311, an imaging unit 312, a display 313, a processing management unit 321, an irradiation control unit 322, a display control unit 323, an imaging control unit 324, and a communication unit 320 (first communication unit). The terminal device 350 also includes a distance estimation unit 325, a distance determination unit 326, an image acquisition unit 327, and an image determination unit 328. The irradiation unit 311, the imaging unit 312, the display 313, the irradiation control unit 322, the display control unit 323, the imaging control unit 324, the distance estimation unit 325, the distance determination unit 326, the image acquisition unit 327, and the image determination unit 328 include the functions described above in the embodiment.

The processing server 360 includes a communication unit (second communication unit) connected to the terminal device 350. The communication unit 320 is connected to the processing server 360 and transmits various kinds of data to the processing server 360. The processing server 360 receives the various kinds of data from the terminal device 350 and performs processing using the received data. The processing server 360 transmits the results of the various kinds of processing to the terminal device 350.

The processing management unit 321 causes the imaging control unit 324, the distance estimation unit 325, and the distance determination unit 326 to perform respective processes (steps S11 to S14 described above). The processing management unit 321 transmits the result of the determination on whether the acquired image 332 matches the reference image 333 from the communication unit 320 to the processing server 360.

If the processing server 360 receives the result of the determination that the acquired image 332 matches the reference image 333, it identifies the current optical device as the identification target 110. The processing server 360 transmits the result that the current optical device is the identification target 110 to the terminal device 350. The communication unit 320 receives the result of the identification by the processing server 360 from the processing server 360. The processing management unit 321 causes the display 313 to display the result of the identification that the current optical device is a genuine article (step S15).

If the processing server 360 receives the result of the determination that the acquired image 332 does not match the reference image 333, it identifies the current optical device as not being an identification target 110. Then, the processing server 360 transmits the result that identification of the current optical device is impossible to the terminal device 350. The communication unit 320 receives the result of incapability of identification by the processing server 360 from the processing server 360. The processing management unit 321 causes the display 313 to display the result that identification of the current optical device is impossible (step S16).

In this manner, the processing server 360 may include the identification function that the processing management unit 321 includes in the foregoing embodiment and transmit the result of the identification to the terminal device 350. In this case, the processing server 360 may be connected to a plurality of different terminal devices 350 to transmit different results of identification to the terminal devices 350.

Figure 13:
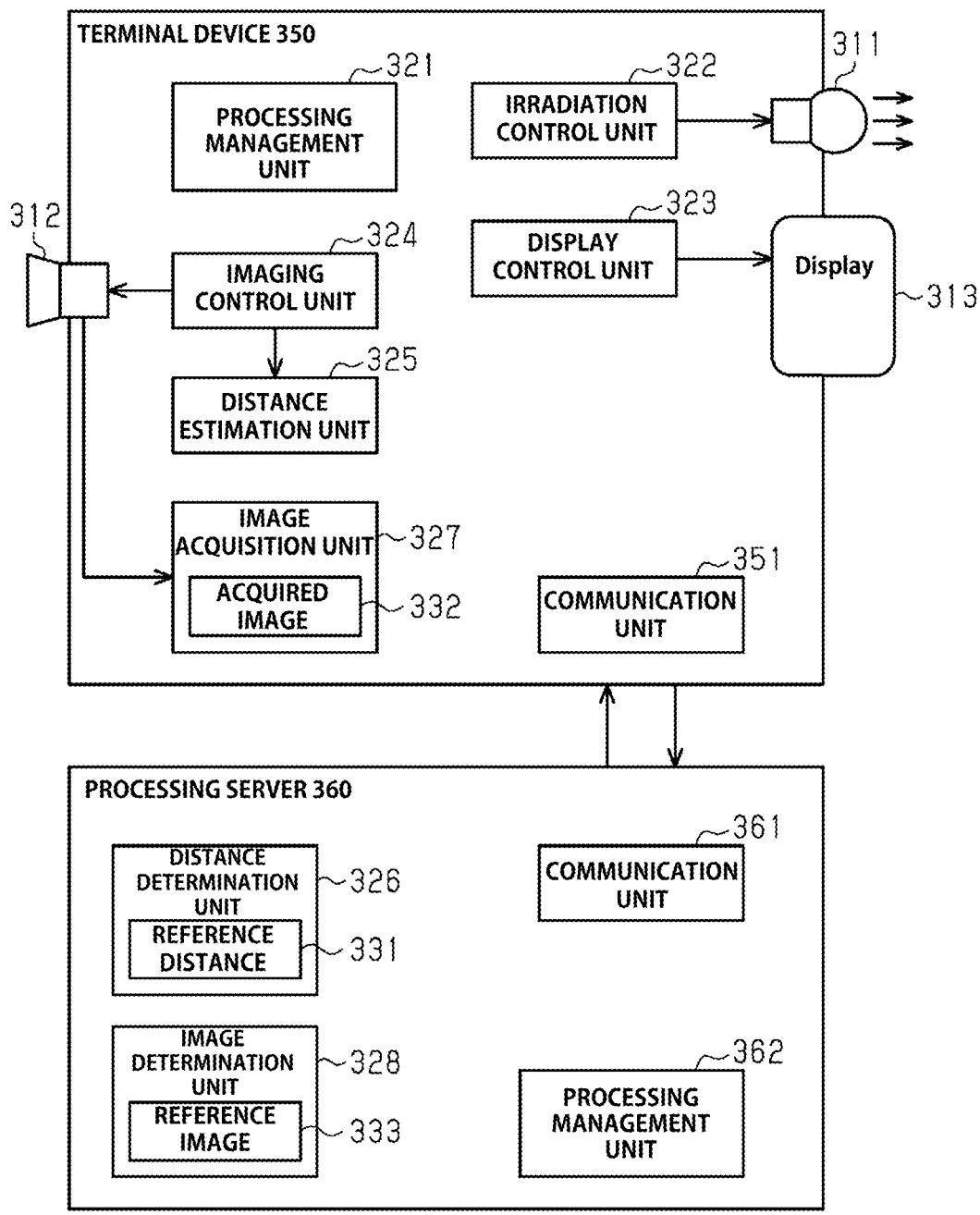
FIG. 13 is a block diagram illustrating a functional configuration of an identification apparatus or system in a modification example.

As illustrated in FIG. 13, the identification apparatus may be configured from a terminal device 350 and a processing server 360. The terminal device 350 includes an irradiation unit 311, an imaging unit 312, a display 313, a processing management unit 321, an irradiation control unit 322, a display control unit 323, an imaging control unit 324, a distance estimation unit 325, and a communication unit 351 (first communication unit). The irradiation unit 311, the imaging unit 312, the display 313, the irradiation control unit 322, the display control unit 323, the imaging control unit 324, and the distance estimation unit 325 include the functions described in the foregoing embodiment.

The processing management unit 321 causes the imaging control unit 324 and the distance estimation unit 325 to perform respective processes (steps S11 and S12 described above). The processing management unit 321 transmits the estimated value outputted by the distance estimation unit 325 to the processing server 360 through the process performed by the communication unit 351 connected to the processing server 360. The processing management unit 321 repeats the capture of an image by the imaging unit 312, the acquisition of the image by the image acquisition unit 327, and the calculation of the estimated value by the distance estimation unit 325 until the processing server 360 determines that the estimated value matches the reference distance 331.

The processing server 360 includes a processing management unit 362, a distance determination unit 326, an image determination unit 328, and a communication unit 361 (the second communication unit). The processing management unit 362 causes the distance determination unit 326 to sequentially determine whether the received estimated value matches the reference distance 331. The processing management unit 362 transmits the result of the determination on whether the estimated value matches the reference distance 331 to the terminal device 350 through the process performed by the communication unit 361.

If it is determined that the estimated value matches the reference distance 331, the processing management unit 362 determines whether the acquired image 332 matches the reference image 333 through the process performed by the image determination unit 328. In this case, the acquired image 332 used by the image determination unit 328 for determination is an example of a determination target and is an image captured with specific optical parameters. The specific optical parameters are optical parameters used in the calculation of the estimated value determined as matching the reference distance 331.

If it is determined that the acquired image 332 matches the reference image 333, the processing management unit 362 identifies the current optical device as the identification target 110. Then, the processing management unit 362 transmits the result of the identification to the terminal device 350 and causes the display 313 to display the fact that the current optical device is identified as a genuine article through control by the display control unit 323.

If it is not determined that the acquired image 332 matches the reference image 333, the processing management unit 362 cannot identify the current optical device as the identification target 110. That is, the processing management unit 362 transmits the result of the identification to the terminal device and causes the display 313 to display the fact that identification of the current optical device is impossible.

As above, the processing server 360 may include the determination function and the identification function that the processing management unit 321 includes in the foregoing embodiment, and transmit the result of the identification to the terminal device 350. In this case, the processing server 360 may be connected to a plurality of different terminal devices 350 to transmit different results of identification to the terminal devices 350.

In the example illustrated in FIG. 13, if it is determined that the acquired image 332 matches the reference image 333, the processing management unit 362 may transmit the result of the determination to the terminal device 350, and the processing management unit 321 may identify the current optical device as the identification target 110 based on the received result of the determination. If it is determined that the acquired image 332 does not match the reference image 333, the processing management unit 362 may transmit the result of the determination to the terminal device 350, and the processing management unit 321 may determine that it is not possible to identify the current optical device as the identification target 110 based on the received result of the determination.

In the example illustrated in FIG. 13, the identification apparatus may be configured by the processing server 360. Specifically, the identification apparatus includes the processing management unit 362, the distance determination unit 326, the image determination unit 328, and the communication unit 361 (the second communication unit), and identifies the optical device as the identification target if conditions are satisfied including a condition that it is determined that the estimated value transmitted from the terminal device 350 matches the reference distance and a condition that it is determined that the image transmitted from the terminal device 350 matches the reference image.

Reference Signs List: α . . . Operating angle; β . . . Imaging angle; θ . . . Irradiation angle; λ . . . Wavelength; d . . . Pitch; f . . . Operating distance; IL . . . Irradiation light; RL . . . Specular reflected light; 110 . . . Identification target; 111 . . . Display part; 210 . . . Substrate layer; 220 . . . Intermediate layer; 230 . . . Reflection layer; 231 . . . Diffraction grating; 231S . . . Surface; 232 . . . Convex surface; 310 . . . Identification apparatus or system; 310S . . . Mounting surface; 311 . . . Irradiation unit; 312 . . . Imaging unit; 313 . . . Display; 321 . . . Processing management unit; 322 . . . Irradiation control unit; 323 . . . Display control unit; 324 . . . Imaging control unit; 325 . . . Distance estimation unit; 326 . . . Distance determination unit; 327 . . . Image acquisition unit; 328 . . . Image determination unit; 329 . . . Guidance processing unit; 331 . . . Reference distance; 332 . . . Acquired image; 333 . . . Reference image; 334 . . . Reference angle.

What is claimed is:

1. An identification system that identifies whether an optical device matches an identification target, comprising:
    with respect to a normal to a first surface of the identification target, an incident side of light is in a negative angular range, and a specular reflection side of the light is in a positive angular range, the identification target including on the first surface a diffraction grating that emits diffracted light in the negative angular range;
    an irradiation unit that is located on a second surface of the identification system and applies visible light to a surface of the optical device, the second surface being oriented toward the optical device, the second surface is a flat surface, a surface of the irradiation unit that applies the visible light is parallel to the second surface of the identification device;
    an imaging unit that is located on the second surface, so that a surface of the imaging unit that is parallel to the second surface captures an image of the surface of the optical device with an angle between the normal to the surface of the optical device and a direction of the diffracted light that is emitted from the surface of the optical device and is entering the imaging unit being a reference angle, the reference angle being formed by the normal to the first surface of the identification target and a direction of the diffracted light that is emitted from the first surface of the identification target and is entering the imaging unit and being an angle at which the light diffracted by the diffraction grating is capable of being recorded by the imaging unit;
    an estimation unit that comprises a memory and a processor operatively coupled to the memory, the processor is configured to perform operations comprising, estimating a distance between the surface of the optical device and the imaging unit as an estimated value;
    a first determination unit that comprises a memory and a processor operatively coupled to the memory, the processor is configured to perform operations comprising, determining whether the estimated value matches a reference distance, the reference distance being between the first surface of the identification target and the imaging unit and being a distance at which the light diffracted by the diffraction grating is capable of being recorded by the imaging unit;
    a second determination unit that comprises a memory and a processor operatively coupled to the memory, the processor is configured to perform operations comprising, determining whether the image captured by the imaging unit matches a reference image, the reference image being formed from the light diffracted by the diffraction grating; and
    an identification unit that comprises a memory and a processor operatively coupled to the memory, the processor is configured to perform operations comprising, identifying the optical device as the identification target when conditions are satisfied including a condition that the first determination unit determines that the estimated value matches the reference distance and a condition that the second determination unit determines that the image captured by the imaging unit matches the reference image, wherein the distance between the irradiation unit and the imaging unit is 5 mm or more and 20 mm or less along the second surface of the identification system and wherein an operating distance between the first surface of the identification target and the imaging unit is 50 mm or more and 200 mm or less.

2. The identification system of claim 1, further comprising a guidance unit that, when the first determination unit determines that the estimated value does not match the reference distance, outputs guidance externally from the identification system, wherein
    the guidance outputted by the guidance unit is guidance for leading the identification system to a position at which the estimated value matches the reference distance.

3. The identification system of claim 1, wherein
    the imaging unit includes an imaging optical system for imaging the surface of the optical device, drives the imaging optical system so that an image point of the optical device lies in an image plane, and captures an image of the surface of the optical device with the image point of the optical device lying in the image plane, and the operations that the processor of the estimation unit is configured to perform comprise calculating the estimated value using optical parameters of the imaging optical system, the optical parameters being used when the imaging unit captures the image of the surface of the optical device.

4. The identification system of claim 1, wherein the imaging unit captures a plurality of images of the surface of the optical device with the angle between the normal to the surface of the optical device and a direction of the diffracted light that is emitted from the surface of the optical device and is entering the imaging unit being the reference angle and with the distance between the surface of the optical device and the imaging unit being different for each of the plurality of images, the operations that the processor of the estimation unit is configured to perform comprise calculating the estimated value of the distance for each of the images, the distance being the distance during capture of each of the images, the operations that the processor of the first determination unit is configured to perform comprise determining whether each estimated value matches the reference distance, and the operations that the processor of the second determination unit is configured to perform comprise determining whether at least one of the images for which the first determination unit determines that the estimated value matches the reference distance matches the reference image.

5. The identification system of claim 1, wherein the imaging unit captures a plurality of images of the surface of the optical device with the angle between the normal to the surface of the optical device and a direction of the diffracted light that is emitted from the surface of the optical device being the reference angle and with the distance between the surface of the optical device and the imaging unit being different for each of the plurality of images, the operations that the processor of the second determination unit is configured to perform comprise determining whether each of the images matches the reference image, the operations that the processor of the estimation unit is configured to perform comprise calculating the estimated value of the distance for at least one of the images determined by the second determination unit as matching the reference image, the distance being the distance during capture of the at least one of the images, and the operations that the processor of the first determination unit is configured to perform comprise determining whether the estimated value during capture of the at least one of the images determined by the second determination unit as matching the reference image matches the reference distance.

6. The identification system according to claim 1, wherein the identification system includes a terminal device and a server, the terminal device includes the irradiation unit, the imaging unit, the estimation unit, the first determination unit, the second determination unit, and a first communication unit that transmits a result of the determination by the first determination unit and a result of the determination by the second determination unit, and the server includes a second communication unit that receives the determination results from the first communication unit and the identification unit that performs identification using the determination results received by the second communication unit.

7. The identification system according to claim 1, wherein the identification system includes a terminal device and a server, the terminal device includes the irradiation unit, the imaging unit, the estimation unit, and a first communication unit that transmits the image captured by the imaging unit and the estimated value to the server, the server includes a second communication unit that receives the image captured by the imaging unit and the estimated value from the first communication unit, the first determination unit that performs determination using the estimated value received by the second communication unit, the second determination unit that performs determination using the image received by the second communication unit, and the identification unit, and the second communication unit transmits a result of the identification by the identification unit to the terminal device.

8. The identification system of claim 1, wherein the identification target comprises a substrate layer, an intermediate layer, and a reflection layer; the intermediate layer includes concavities and convexities defining an uneven shape of the intermediate layer; the reflection layer has an even shape that follows the uneven shape of the intermediate layer and serves as the diffraction grating of the identification target.

9. The identification system of claim 1, wherein the diffraction grating comprises a plurality of convex surfaces that are regularly aligned in two orthogonal directions along the first surface of the identification target.

10. The identification system of claim 1, wherein the diffraction grating comprises a plurality of convex surfaces extending in a first direction along the first surface of the identification target, wherein the convex surfaces are regularly aligned in a second direction along the first surface of the identification target, the first direction being perpendicular to the second direction.

11. An identification method for identifying whether an optical device matches an identification target using an identification system, comprising the steps of:

with respect to a normal to a first surface of the identification target, an incident side of light is in a negative angular range, and a specular reflection side of the light is in a positive angular range, the first surface of the identification target including a diffraction grating that emits diffracted light in the negative angular range, the identification system including an irradiation unit and an imaging unit on a second surface of the identification system, the second surface being oriented toward the optical device, the second surface is a flat surface, the identification method comprising steps comprising:

applying visible light to a surface of the optical device, wherein a surface of the irradiation unit that applies the visible light is parallel to the second surface of the identification device;

capturing an image of the surface of the optical device with an angle between the normal of the surface of the optical device and a direction of the diffracted light that is emitted from the surface of the optical device and is entering the imaging unit being a reference angle, the reference angle being formed by the normal to the first surface of the identification target and a direction of the diffracted light that is emitted from the first surface fof the identification target and is entering the imaging unit and being an angle at which the light diffracted by the diffraction grating is capable of being recorded by the imaging unit, the diffracted light enters the imaging unit through a surface that is parallel to the second surface;

estimating a distance between the surface of the optical device and the imaging unit as an estimated value;

determining whether the estimated value matches a reference distance, the reference distance being between the first surface of the identification target and the imaging unit and being a distance at which the light diffracted by the diffraction grating is capable of being recorded by the imaging unit;

determining whether the image captured by the imaging unit matches a reference image, the reference image being formed from the light diffracted by the diffraction grating; and identifying the optical device as the identification target when conditions are satisfied including a condition that it is determined that the estimated value matches the reference distance and a condition that it is determined that the image captured by the imaging unit matches the reference image, wherein the distance between the irradiation unit and the imaging unit is 5 mm or more and 20 mm or less along the second surface of the identification system and wherein an operating distance between the first surface of the identification target and the imaging unit is 50 mm or more and 200 mm or less.

12. The identification method of claim 11, further comprising outputting guidance externally when the estimated value is determined not to match the reference distance, wherein
the guidance leads the identification system to a position at which the estimated value matches the reference distance.

13. The identification method of claim 11, wherein
the imaging unit comprises an imaging optical system for imaging the surface of the optical device, and the method further comprises driving the imaging optical system so that an image point of the optical device lies in an image plane, capturing an image of the surface of the optical device with the image point of the optical device lying in the image plane, and
calculating the estimated value using optical parameters of the imaging optical system, the optical parameters being used when the imaging unit captures the image of the surface of the optical device.

14. The identification method of claim 11, comprising
capturing by the imaging unit a plurality of images of the surface of the optical device with the angle between the normal to the surface of the optical device and a direction of the diffracted light that is emitted from the surface of the optical device and is entering the imaging unit being the reference angle and with the distance between the surface of the optical device and the imaging unit being different for each of the plurality of images,
calculating the estimated value of the distance for each of the images, the distance being the distance during capture of each of the images,
determining whether each estimated value matches the reference distance, and determining whether at least one of the images for which it was determined that the estimated value matches the reference distance matches the reference image.

15. The identification method of claim 11, comprising
capturing by the imaging unit a plurality of images of the surface of the optical device with the angle between the normal to the surface of the optical device and a direction of the diffracted light that is emitted from the surface of the optical device being the reference angle and with the distance between the surface of the optical device and the imaging unit being different for each of the plurality of images,
determining whether each of the images matches the reference image,
calculating the estimated value of the distance for at least one of the images determined as matching the reference image, the distance being the distance during capture of the at least one of the images, and
determining whether the estimated value during capture of the at least one of the images determined as matching the reference image matches the reference distance.

16. A non-transitory computer-readable medium comprising an identification program for causing a system including an irradiation unit and an imaging unit to act as an identification system that identifies whether an optical device matches an identification target, comprising:
with respect to a normal to a first surface of the identification target, an incident side of light is in a negative angular range, and a specular reflection side of the light is in a positive angular range,
the first surface of the identification target includes a diffraction grating that emits diffracted light in the negative angular range,
the irradiation unit and the imaging unit are included on a second surface of the apparatus, the second facing being oriented toward the optical device, the second surface being a flat surface,
the identification program causing the apparatus to execute steps comprising:
applying visible light to a surface of the optical device, wherein a surface of the irradiation unit that applies the visible light is parallel to the second surface;
capturing an image of the surface of the optical device with an angle between the normal of the surface of the optical device and a direction of the diffracted light that is emitted from the surface of the optical device and is entering the imaging unit being a reference angle, the reference angle being formed by the normal to the first surface of the identification target and a direction of the diffracted light that is emitted from the first surface of the identification target and is entering the imaging unit and being an angle at which the light diffracted by the diffraction grating is capable of being recorded by the imaging unit, the diffracted light enters the imaging unit through a surface that is parallel to the second surface;
estimating a distance between the surface of the optical device and the imaging unit as an estimated value;
determining whether the estimated value matches a reference distance, the reference distance being between the first surface of the identification target and the imaging unit and being a distance at which the light diffracted by the diffraction grating is capable of being recorded by the imaging unit;
determining whether the image captured by the imaging unit matches a reference image, the reference image being formed from the light diffracted by the diffraction grating; and identifying the optical device as the identification target when conditions are satisfied including a condition that it is determined that the estimated value matches the reference distance and a condition that it is determined that the image captured by the imaging unit matches the reference image, wherein the distance between the irradiation unit and the imaging unit is 5 mm or more and 20 mm or less along the second surface of the identification system and wherein an operating distance between the first surface of the identification target and the imaging unit is 50 mm or more and 200 mm or less.

* * * * *